United States Patent
Eckel

(10) Patent No.: US 10,332,191 B1
(45) Date of Patent: Jun. 25, 2019

(54) STEGANOGRAPHIC-BASED SYSTEM AND METHOD USING DIGITAL IDENTIFICATION

(71) Applicant: MorphoTrust USA, LLC, Billerica, MA (US)

(72) Inventor: Robert Andrew Eckel, Andover, MA (US)

(73) Assignee: MorphoTrust USA, LLC, Billerica, MA (US)

(*) Notice: Subject to any disclaimer, the term of this patent is extended or adjusted under 35 U.S.C. 154(b) by 639 days.

(21) Appl. No.: 14/968,229

(22) Filed: Dec. 14, 2015

Related U.S. Application Data

(60) Provisional application No. 62/091,311, filed on Dec. 12, 2014.

(51) Int. Cl.
  *G06Q 30/06* (2012.01)
  *H04L 29/06* (2006.01)
  *G06Q 20/40* (2012.01)
  *G06K 9/00* (2006.01)

(52) U.S. Cl.
  CPC ..... *G06Q 30/0635* (2013.01); *H04L 63/0861* (2013.01); *G06K 9/00* (2013.01); *G06Q 20/4014* (2013.01); *G06Q 20/40145* (2013.01); *H04L 63/08* (2013.01)

(58) Field of Classification Search
  CPC .................................. G06Q 30/0601–30/0645
  See application file for complete search history.

(56) References Cited

U.S. PATENT DOCUMENTS

| | | | |
|---|---|---|---|
| 8,660,965 B1* | 2/2014 | Bickerstaff | G06Q 20/3224 235/379 |
| 9,202,105 B1 | 12/2015 | Wang et al. | |
| 2002/0095388 A1* | 7/2002 | Yu | G06Q 20/04 705/67 |
| 2005/0169496 A1* | 8/2005 | Perry | G06F 21/10 382/100 |
| 2014/0058902 A1* | 2/2014 | Taylor | G06Q 30/0635 705/26.81 |

(Continued)

OTHER PUBLICATIONS

Newman, Hacker Lexicon: What is Steganography?, Jun. 26, 2017, p. 1 (Year: 2017).*

(Continued)

*Primary Examiner* — William J Allen
*Assistant Examiner* — Maria S. P. Heath
(74) *Attorney, Agent, or Firm* — Fish & Richardson P.C.

(57) ABSTRACT

A steganographic-based ordering system and method using a digital identification (ID) are described. A user may obtain a digital ID card on a user device and select modes for interacting with the vendor. Using the digital ID, the user can create a personal profile that indicates the user's preferences, and place an order for an item (e.g., a product or service) through the digital ID. The order may be steganographically-embedded along with user data within the digital ID. The digital ID including the steganographically-em bedded order is transmitted to a digital ID reader located at the vendor. When completing an order for the user, the digital ID reader may de-embed user and order data from the received digital ID to obtain information about the user and provide more personalized service to complete the order.

20 Claims, 11 Drawing Sheets

(56) References Cited

U.S. PATENT DOCUMENTS

2014/0294175 A1* 10/2014 Boloker .................. H04L 9/28
           380/30

OTHER PUBLICATIONS

Volodymyr Mosorov, Steganography in E-Commerce; Possibilities and Applications, 2013, Studies & Proceedings of Polish Association for Knowledge Management, No. 65, pp. 49-59 (Year: 2013).*

* cited by examiner

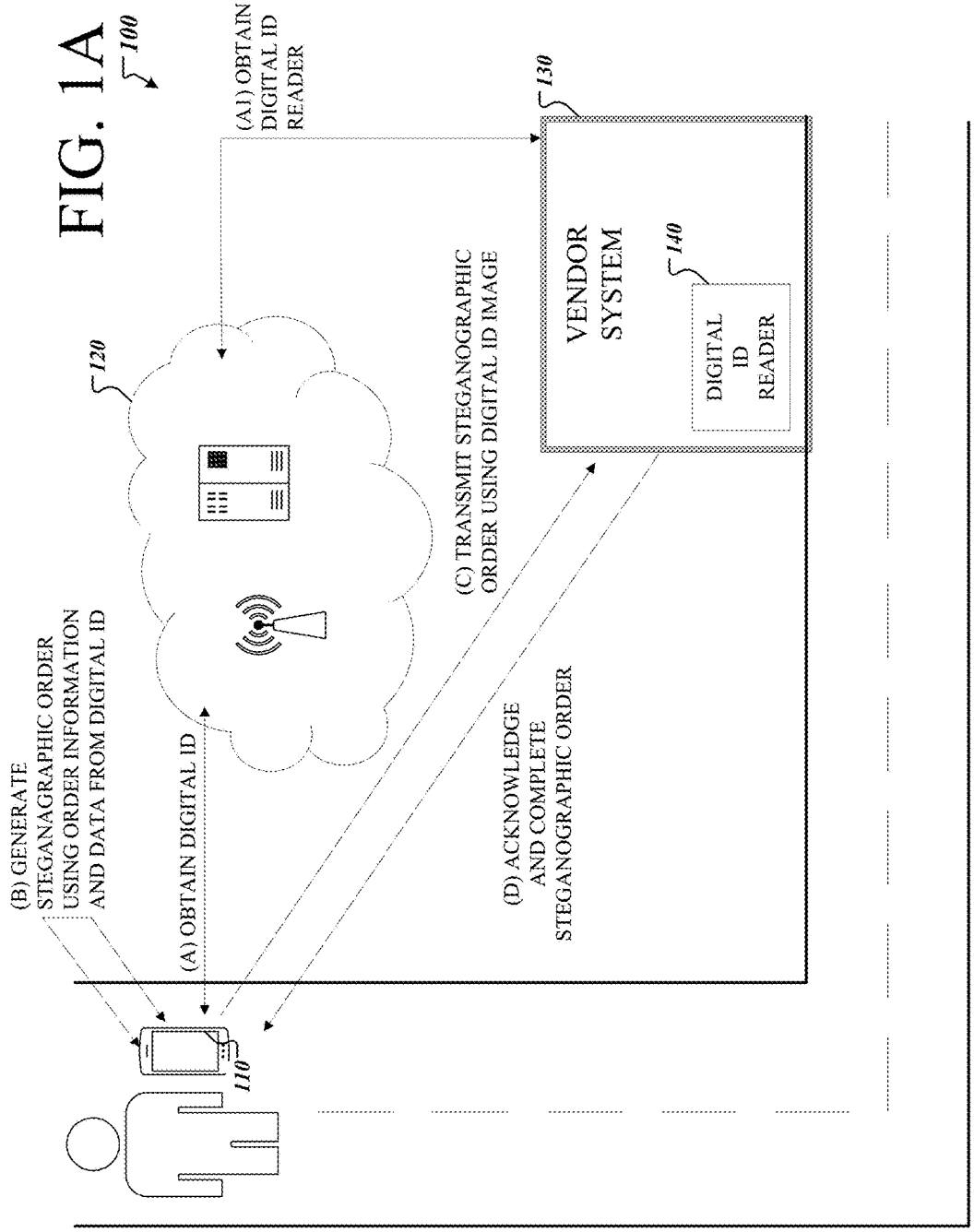

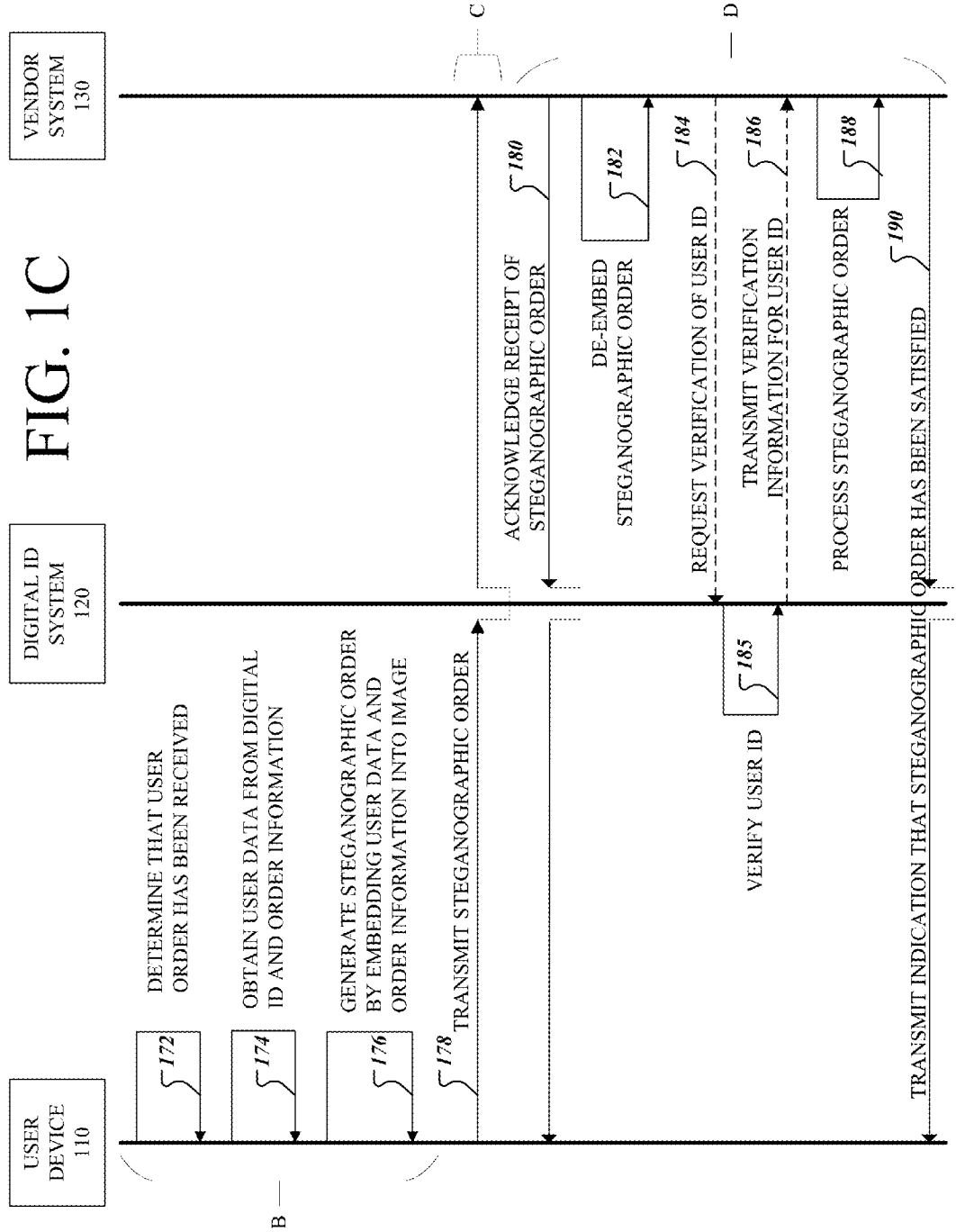

STEGANOGRAPHIC-BASED SYSTEM AND METHOD USING DIGITAL IDENTIFICATION

CROSS REFERENCE TO RELATED APPLICATION

This application claims the benefit of U.S. provisional patent application No. 62/091,311, filed on Dec. 12, 2014, which is incorporated by reference herein in its entirety.

FIELD

This disclosure generally relates to digital identifications.

BACKGROUND

Issued identifications are used to prove information regarding people. For example, a driver's license may be used to prove a holder's birthdate or identity.

SUMMARY

This disclosure generally describes a steganographic-based ordering system and method for digital identification cards.

Innovative aspects of the subject matter described in this specification may, in some implementations, be embodied in a computer-implemented method that includes actions of obtaining, by a client device, order information describing an item to order from a vendor for a user, and determining, by the client device, to order the item for the user. In response to determining to order the item for the user, an image associated with the user is obtained from a digital identification of the user stored on the client device. The method further includes generating, by the client device, a steganographic image by steganographically embedding the order information in the image associated with the user from the digital identification of the user, and providing, by the client device, the steganographic image to a vendor system of the vendor.

In some implementations, a non-transitory computer-readable storage medium is provided and includes instructions, which, when executed by one or more computers, cause the one or more computers to perform actions. The actions include obtaining order information describing an item to order from a vendor for a user, and determining to order the item for the user. In response to determining to order the item for the user, an image associated with the user is obtained from a digital identification of the user stored on the client device. The actions further include generating a steganographic image by steganographically embedding the order information in the image associated with the user from the digital identification of the user, and providing the steganographic image to a vendor system of the vendor.

In some implementations, a system includes one or more computers and one or more storage devices storing instructions that are operable and when executed by one or more computers, cause the one or more computers to perform actions. The actions include obtaining order information describing an item to order from a vendor for a user, and determining to order the item for the user. In response to determining to order the item for the user, an image associated with the user is obtained from a digital identification of the user stored on the client device. The actions further include generating a steganographic image by steganographically embedding the order information in the image associated with the user from the digital identification of the user, and providing the steganographic image to a vendor system of the vendor.

Other implementations of these aspects include corresponding systems, apparatus, computer-readable storage mediums, and computer programs configured to implement the actions of the above-noted method.

These and other implementations may each optionally include one or more of the following features. For instance, in some implementations, the image associated with the user obtained from the digital identification of the user includes an image file, one or more of biometric data of the user, identification information of the user, and membership information of the user with the vendor. The order information includes one or more of an indication of the item being ordered, an operation mode to implement the order, and payment information.

In some implementations, obtaining the order information describing the item to order from the vendor for the user includes determining that the user has selected one of a first operation mode, a second operation mode, or a third operation mode to implement the order. Providing the steganographic image to the vendor system of the vendor includes determining a location of the user and a location of the vendor system of the vendor. In the first operation mode, the steganographic image is transmitted to the vendor system in response to the location of the user and the location of the vendor system of the vendor being the same. In the second operation mode, the steganographic image is transmitted to the vendor system in response to the location of the user being within a first threshold distance of the location of the vendor system of the vendor. The first threshold distance is set by the user. In the third operation mode, the steganographic image is transmitted to the vendor system in response to the location of the user corresponding to a distance that is greater than the first threshold distance from the location of the vendor system of the vendor.

In some implementations, the digital identification includes user data verified by a third-party resource.

In some implementations, the digital identification includes the image associated with the user that is selected by the user or provided by a third-party resource.

In some implementations, generating the steganographic image includes steganographically embedding the order information and user identification information into the obtained image to generate the steganographic image such that the steganographic image appears unaltered to a human eye and the order information and the user identification information is not visible to the human eye.

In some implementations, generating the steganographic image includes modifying one or more pixel values of the image without changing an appearance of the image to a human eye.

In some implementations, the method further includes receiving an indication that one or more actions have been performed to satisfy the order. The one or more actions include receiving the item associated with the order by the user, completing the order by the vendor, canceling, by the user or the vendor, the order, and modifying, by the user or the vendor, the order.

In some implementations, the receiving of the indication that the one or more actions have been performed to satisfy the order includes one or more of: receiving an input from the user indicating that the order is complete, receiving a steganographic message from the vendor system indicating that the order is complete, receiving an audio signal that includes data matching an identification of the user included in the digital identification of the user, and determining that a time duration after the steganographic image was provided to the vendor system satisfies an expiration threshold.

In some implementations, providing, by the client device, the steganographic image to the vendor system of the vendor includes displaying, on a screen of the client device, the steganographic image.

In some implementations, providing, by the client device, the steganographic image to the vendor system of the vendor includes transmitting, by the client device over a network, the steganographic image.

The details of one or more implementations are set forth in the accompanying drawings and the description below. Other features and advantages will become apparent from the description, the drawings, and the claims.

BRIEF DESCRIPTION OF THE DRAWINGS

FIG. 1A depicts a diagram illustrating a system for ordering an item using a digital identification.

FIG. 1C depicts a flowchart illustrating a method for obtaining and processing a steganographic order.

DETAILED DESCRIPTION

Figure 1B:
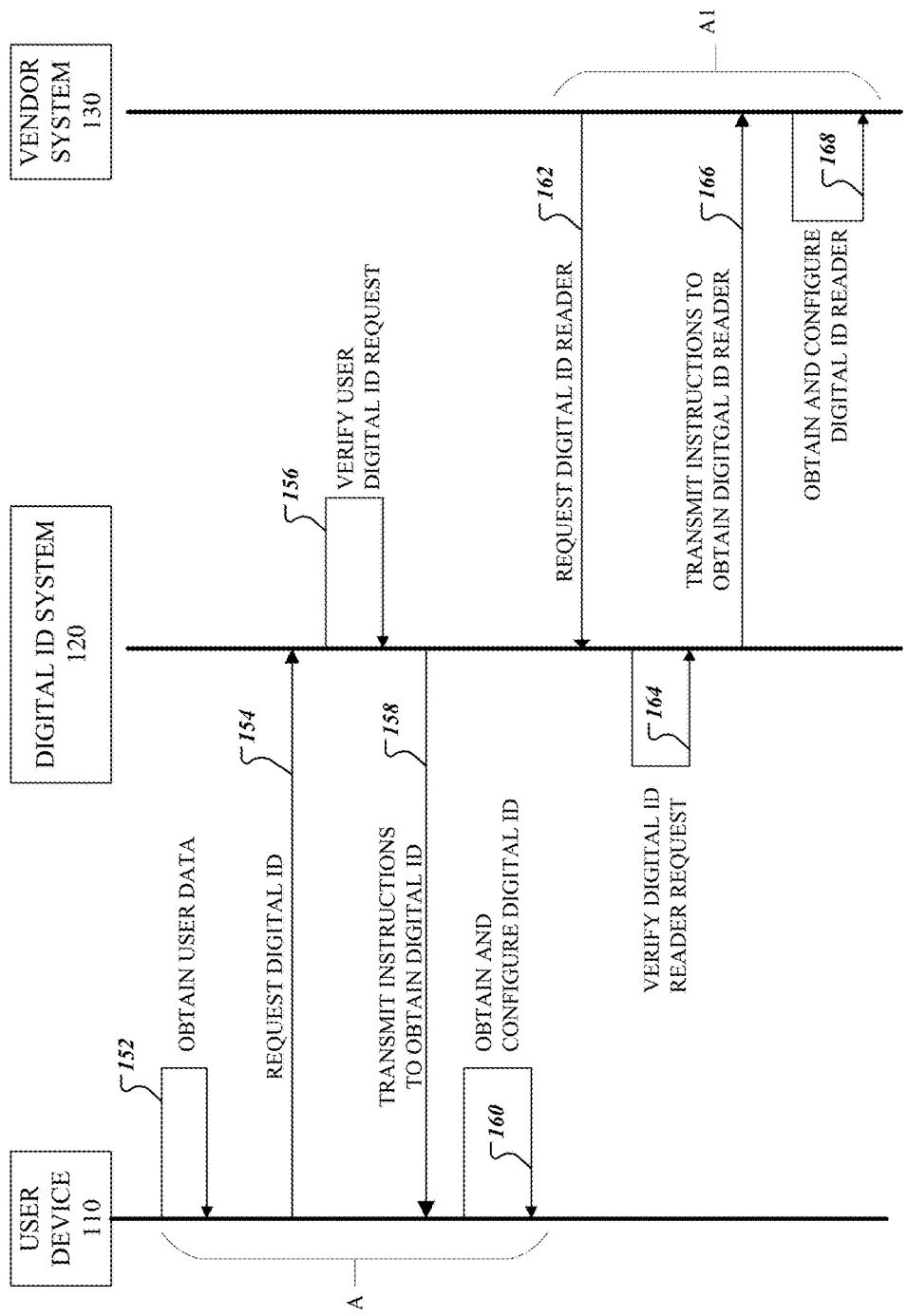
FIG. 1B depicts a flowchart illustrating a method for obtaining a digital identification and a digital identification reader.

This disclosure generally describes a steganographic-based ordering system and method using a digital identification (ID). In general, a user may obtain a digital ID card on a user device to interact with a vendor (e.g., business or retailer) in a more personalized and convenient manner. The user may select modes for interacting with the vendor through the digital ID and may create a personal profile that indicates the user's preferences. The user may place an order for an item (e.g., products or services) through the digital ID, and the order may be steganographically-embedded along with user data within the digital ID. The digital ID including the steganographically-embedded order is transmitted to a digital ID reader located at the vendor. When completing an order for the user, the digital ID reader may de-embed user and order data from the received digital ID to obtain information about the user and provide more personalized service to complete the order. Hereinafter, exemplary implementations of a steganographic-based ordering system and method using digital ID cards will be described.

Referring to FIG. 1A, a system 100 for ordering an item using a digital identification (ID) is illustrated. The system 100 may include a user device 110, a digital ID system 120, and a vendor system 130.

A user may use the user device 110 to enroll into a program associated with a vendor and obtain a digital ID from the digital ID system (A). A vendor at the vendor system 130 may obtain a digital ID reader 140 from the digital ID system 120 to facilitate transactions for users enrolled in the program (A1). Details of actions A and A1 are described below with reference to FIG. 1B. After enrolling into a program and obtaining a digital ID, the user device 110 may receive order information from the user and generate a steganographic order using the received order information and data obtained from the digital ID (B). The steganographic order is embedded within the digital ID which is then transmitted to a digital ID reader 140 at the vendor system 130 (C). In some cases, the steganographic order may be transmitted wirelessly to the digital ID reader 140. In some cases, the digital ID reader 140 may scan a representation of the steganographic order displayed on the user device 110. In response to receiving or scanning the steganographic order, the digital ID reader 140 sends an acknowledgement of the user device 110 and processes the steganographic order to complete it (D). Details of actions B, C, and D are described further in FIG. 1C.

Referring to FIG. 1B, the user may decide to enroll into a program to receive personalized and enhanced customer services at one or more vendors. A vendor may refer to any business, retailer, and/or organization that offers a product or service to customers. In some cases, a vendor may refer to a consortium of vendors that allow the user to register with the system of the consortium and selectively determine what information to provide to any vendor of the consortium. The user may enroll into the program through various suitable means. For example, in some cases, the user may download an application onto the user device 110. In some cases, the user may register for the program through a web interface on the Internet. In some cases, the user may register at a physical location associated with a retailer.

After enrolling into a program, the user may input a user request indicating that the user would like to obtain a digital ID at the user device 110. In response to receiving the user request, the user device 110 may display one or more graphical user interfaces (GUIs) to obtain user identification data from the user to help verify the user's identity (152). The user identification data may include, but is not limited to, one or more of an image of the user, an image of the user's iris, an image of the user's passport or driver's license, a finger print, a date of birth, a residential address, biometric and demographic information, and, in general, any data that may provide information on an identification of the user. In some cases, the user identification data may also include an individual identification number or a membership number used by a particular vendor to identify the user.

The user identification data may be received through various suitable devices including, but not limited to, an alphanumeric input device (e.g., a touch screen, keyboard), an image acquisition device (e.g., camera, scanner), and various other suitable sensors.

After receiving the user identification data, the user device 110 may generate a digital ID request message inclusive of the user identification data and transmit the request message to a digital ID system 120. The digital ID system 120 may verify the user identification data in the received digital ID request message (156). For example, the user identification data is sent to a secure server, which compares the provided user identification data to information stored in a verified and secure third-party resource/identification database (e.g., government-issued ID database, state Image servers, and driver's license database). If the comparison of user-provided user identification data and the information stored in the third-party resource/identification database satisfies a certain threshold (e.g., the user identification data matches stored information in the third-party resource/identification database for more than a threshold percentage amount), the user's identity is verified as valid. If the comparison of user-provided user identification data and the information stored in the third-party resource/identification database does not satisfy a certain threshold (e.g., the user identification data does not match stored information in the third-party resource/identification database for more than a threshold percentage amount), the user's identity is determined not to be valid.

In some implementations, verification of the user identification data may be performed in the digital ID system 120.

After verifying that the user identification data sent in the request message is valid, the digital ID system 120 may transmit instructions for obtaining the digital ID to the user device 110 (158). For example, a file, link, or interface corresponding to the digital ID may be transmitted to the user device 110 via e-mail or any other secure messaging means. A user, in some cases, may elect to download the file or select the link to obtain the digital ID using the user device 110.

The digital ID may include an application that allows the user to carry and display information on the user device 110. In some implementations, the digital ID may include a portion of the user identification information provided by the user. For example, the digital ID may include an image of the user provided by the user. In some implementations, the digital ID may include, at least in part, identification information provided by the secure third-party resource/identification database. For example, the digital ID may include an image of the user provided by the secure third-party resource/identification database. In general, the digital ID may include one or more of a first name, last name, address, gender, date of birth, expiration date, issue date, and image associated with the user.

After obtaining the digital ID, a user may further configure or personalize the digital ID (160). The configuration may include selecting various features including, for example, security features, vendor connections, and user preferences.

In some implementations, the digital ID may be configured to include one or more security features that may be implemented to protect access to the digital ID. For instance, in some cases, the user device 110 may be configured to request input of a password or pin to access the digital ID. The user may be prompted to take a picture of the user's face, finger print, or iris using a camera of the user device 110 to use the picture as a form of a password or pin. The user-provided picture is compared to an image of the user's face, finger print, or iris stored at the digital ID system 120 or secure third-party resource/identification database, and access to the digital ID is provided if the user-provided picture matches the stored image. In some implementations, any form of biometric identification may be requested to provide access to the digital ID.

In some implementations, a user may configure the digital ID to be used with multiple photos or digital content such that each of the multiple photos or digital content can be associated with a particular order. For example, the user may configure the digital ID to use a first image (e.g., an image of the user) when placing a particular order (e.g., coffee), but another image associated with the user (e.g., soccer team picture including the user) to place another order (e.g., a dozen donuts). Accordingly, in some implementations, when the user device 110 receives one of a plurality of images associated with a user's digital ID for placing an order, the user device 110 may determine an order associated with the received image, steganographically embed the image with data associated with the order, and transmit the digital ID with the steganographically embedded image. Multiple images may be added by a user for use with the digital ID after an identity of the user has been verified by the digital ID system 120 as explained above.

In some implementations, the digital ID may be configured with one or more user preferences to generate a user profile associated with the digital ID. The user preferences may include one or more preferences indicative of: 1) vendors visited by the user or of interest to the user; 2) services and/or products generally purchased by the user when visiting the respective vendors; 3) a user affinity of vendors, products, and/or services; and 4) enrollment into a user recognition program. The user's preferences may be updated on a real-time basis as the user uses the digital ID. For example, as a user visits vendors or makes purchases using the digital ID, the user's profile may be updated to reflect the same. Enrollment into the user recognition program may give authorization to a vendor to use a detection device (e.g., camera) at the vendor location to detect the presence of the user at the vendor location, and obtain information associated with the user in response to detecting the presence of the user at the vendor location.

In some implementations, the digital ID may be configured to be used for transactions with particular vendors that the user is interested in. For example, the user may select one or more vendors that the user conducts business with, shops at, or is interested in. As shall be described in further detail below, the digital ID may have various built in features that reflect a transaction of the user with a particular vendor. In some implementations, the digital ID may serve as a customer loyalty card or a member card associated with the vendor. Because the digital ID includes a verified identification of the user, the vendor can conduct transactions with the user via the digital ID with the knowledge that the user's identification has been verified.

In some implementations, the digital ID can be configured with one or more preferred payment options, and may provide access to or directly provide electronic payment systems or electronic wallets. For example, a user may configure the digital ID to include information associated with a credit card of the user, a debit card of the user, a bank account of the user, a gift card purchased by the user, and, in general, various suitable payment mechanisms. Data corresponding to the payment options may be protected using various suitable secure encryption techniques. Since the user's identity has already been verified, a vendor conducting business with the user may be assured that a payment received through the digital ID is being received from a verified source with valid credentials. Accordingly, when a user wishes to purchase a product at a store, the user may access the digital ID through the user device 110 and use the digital ID for identification and payment purposes.

In some implementations, the digital ID may be linked to a merchant account with a vendor. Accordingly, when making a payment for a product/service provided by the vendor, the user's account with the vendor may be deducted by the payment amount.

In some implementations, the user may configure the digital ID to specify the information and content that can be shared with a vendor. For example, for a user who is above the age of twenty-one (21), the user may configure the digital ID not to provide the exact age of the user, but to provide an indication that the user is above the age of twenty-one (21). In some cases, the user may configure the digital ID not to provide any payment information for particular types of vendors if, for example, the user has concerns about the particular vendors' cyber security. In some cases, the user may configure the digital ID not to provide address information, certain biographical or demographic information, and may select particular vendors for which the information may or may not be provided. In general, the user may choose to provide as much or as little information as the user desires for configuring the digital ID. Accordingly, by configuring the digital ID in this manner, the user can control the user information transmitted to any vendor. If additional information (e.g., payment information) is needed to process an order, the digital ID may cause the user device 110 to display an interface requesting the user to input the additional information. If the user fails to provide the additional information, the user device 110 may display a message to inform the user that an order could not be placed due to the insufficiency of requested information.

In some implementations, the digital ID may be configured by the user to associate multiple modes with one or more vendors noted in the user preferences. For example, in a first mode, when a trigger event occurs (e.g., user enters a vendor or is a threshold distance away from a vendor's physical location), an order may be placed automatically by the digital ID for an item that the user most frequently purchases when visiting the vendor. This provides user convenience by reducing the amount of time the user may need to wait to place an order and receive an item from the vendor. In a second mode, when a trigger event occurs, the user may be prompted by the digital ID to indicate whether the user would like to place an order for a product/service from a vendor. In the third mode, no action may be taken unless the user provides an input through the digital ID indicating that the user would like to place an order for an item while visiting a vendor.

It should be understood that the various suitable modes of the digital ID may be configured by the user. The configurations may vary based at least on the type of vendor, a user-selected item, a trigger event, and a distance threshold. For example, the distance threshold may be a particular distance that the user device is located relative to a location of the vendor. The distance threshold can be set to any value, for example, 0.1 miles, 0.5 miles, 1 mile, etc. The trigger event may be any event that leads to another action being triggered. For instance, the trigger event may be configured to launch a graphical user interface or place an order through the digital ID when a location of the user device satisfies the distance threshold, according to the user preferences.

The multiple modes may be assigned for all vendors or may be assigned to specific vendors. For instance, the user may configure the digital ID to be in a first mode when visiting a coffee shop, and in the third mode when visiting a clothes retail store.

Simultaneously or separately to action A, a vendor system 130 may obtain a digital ID reader 140 from the digital ID system (A1) as shown in actions 162-168 in FIG. 1B. In general, vendors may support transactions and interactions with users (e.g., customers and clients) through a vendor system 130. To communicate and interact with a digital ID, the vendor system 130 may utilize a digital ID reader. If a vendor does not possess a digital ID reader, the vendor system 130 may transmit a request to the digital ID system 120 for a digital ID reader (162). The request for a digital ID reader may include information regarding the vendor, such as a vendor name, a registration of the vendor, a tax number of the vendor, and, in general, any information that may identify the vendor.

The digital ID system 120 may verify the request for a digital ID reader received from the vendor system 130 (164). For example, the vendor information provided in the request for a digital ID reader may be sent to a secure server, which compares the provided vendor information to information stored in a verified and secure database/trusted source (e.g., government-issued business ID database, employer database, national or state tax databases). If the comparison of provided vendor information and the information stored in the secure database/trusted source satisfies a certain threshold (e.g., the provided vendor information matches stored information in the secured database/trusted source for more than a threshold percentage amount), the vendor's identity is verified as valid. If the comparison of the provided vendor information and the information stored in the secure database/trusted source does not satisfy a certain threshold (e.g., the provided vendor information does not match stored information in the secured database/trusted source for more than a threshold percentage amount), the user's identity is verified as invalid.

In some implementations, verification of the vendor information may be performed in the digital ID system 120.

After verifying that the vendor information sent in the digital ID reader request is valid, the digital ID system 120 may transmit instructions for obtaining the digital ID reader to the vendor system 130 (166). For example, a file, link, or interface corresponding to the digital ID reader may be transmitted to the vendor system 130 via e-mail or any other secure messaging means. The vendor, in some implementations, may elect to download the file or select the link to obtain the digital ID reader 140. In some implementations, a vendor may receive the digital ID reader 140 via postal mail.

The digital ID reader 140 may include an application that allows the vendor system 130 to communicate with one or more user devices and receive steganographic orders from the one or more user devices. The digital ID reader 140 may receive steganographic orders from one or more user devices through wireless transmission or an optical scan of the digital ID that includes an embedded steganographic order. The digital ID reader 140 may be configured to de-embed data embedded into a steganographic order and utilize the de-embedded data to personalize and process an order, as explained in further detail below with reference to FIGS. 1C, 4, and 8.

After obtaining the digital ID reader 140, a vendor may configure the digital ID reader 140 (168). In some implementations, the vendor may configure the digital ID reader 140 to receive steganographic orders from a particular type of customer or for particular products/services to receive steganographic orders for. For example, the digital ID reader 140 may be configured to receive steganographic orders only from a priority customer, customers who are participating in a particular deal or promotion, or customers who belong to a particular demographic group (e.g., have a local address). In some implementations, the digital ID reader 140 may be configured to receive steganographic orders only for product/services that do not have a limited inventory.

Actions A and A1 may be performed simultaneously or in any sequential order. After completing actions A and A1, a digital ID and digital ID reader 140 may be used to implement a steganographic-based ordering system (e.g., actions B, C, and D as illustrated in FIG. 1A and further described in FIG. 1C).

Referring to FIG. 1C, after a digital ID has been obtained and configured, the user device 110 may determine that order information has been received from the user (172). The user device 110 may obtain order information from the user through various suitable means. For example, in some implementations, the user may place an order using an application specific to a particular vendor. In some implementations, the use may place an order though a web portal. In some implementations, the user may select one or more options displayed using the digital ID to select a vendor and a frequently-ordered item of the vendor. In some implementations, the user may not provide an input, but a trigger event may automatically trigger the placement of an order. As described above, the trigger event may be triggered when a location of the user device satisfies the distance threshold thereby launching a graphical user interface or placement of an order through the digital ID according to the settings of a mode. The order information may include a name of a vendor associated with the order, a name of an item (e.g., product or service) the user would like to order, a quantity of the item, and any other information (e.g., vendor address) that may be helpful to place an order.

In response to determining that order information has been received, the order information is retrieved for further processing and user data is extracted from the digital ID (174). The extracted user data may include, for example, a name of the user, an age of the user, preferred payment information of the user, an address of the user, and, in general, any other personal data of the user that may be used by the vendor for processing the order.

The order information and user data are embedded into an image used by the digital ID to generate a steganographic order (176). As noted above, the image used by the digital ID may be an image provided by the user or by a secure third-party resource/identification database. In some implementations, the image may be a picture of the user that is included in the digital ID. Accordingly, the digital ID embeds the steganographic order that includes the order information and user data in the digital ID image.

In general, various suitable steganographic methods and tools may be used to embed the order information and user data into the digital ID image. For example, least-significant bit (LSB), masking, filtering, and transformation techniques may be used to embed data in the digital ID image. As an example, in LSB, the least significant bit of one or more pixels in an image may be configured or modified to transmit a particular code or message through the digital ID image. Because the change in pixel value is in the LSB, the digital ID image appears to be unaltered to a human eye, and the order information and the user identification information is not visible to the human eye.

In some implementations, the digital ID image used for generating the steganographic order may be a bmp or gif format file because bmp and gif formats provide lossless compression advantages when compressing and decompressing images.

In some implementations, a steganographic key may be used to perform the embedding of order information and user data, and information regarding the steganographic key is provided to the digital ID reader 140 to assist with de-embedding the data embedded into the digital ID image.

After using one or more steganographic methods or tools to generate a steganographic order (176), the steganographic order is transmitted from the user device 110 to the digital ID reader 140 using the digital ID (178). The steganographic order may be transmitted wirelessly to the digital ID reader 140, for example, through a wired or wireless network, or the steganographic order may be shown to the vendor though a display of the user device 110. As an example, when a user is within a threshold distance of a coffee shop, the user's digital ID may be automatically embedded with user data and order information for the user's favorite drink, and sent to the coffee shop. In some cases, the digital ID with embedded user data and order information may be presented at a vendor system 130 of the vendor, which may scan the digital ID to obtain the order information, user identification, and payment information.

Submitting orders using steganography may provide several advantages to consumers and vendors. One advantage may be that private or personal information of a user may be transmitted using an image without any indication that the image includes any embedded data. This may provide one layer of protection against hackers and other third parties that are often searching for personal consumer information. Another layer of protection may be provided in that the embedding of private or personal information is performed according to a steganographic method or key, which hackers and third parties may not be aware of.

Another advantage may be that placing steganographic orders provides a user with the ability to share personal information with a vendor in a more subtle and inconspicuous manner. For instance, during instances where age verification may be needed to purchase an item, users who are less willing to share their age in public do not have to display an ID with a date of birth or vocally announce their age to a vendor. Rather, by transmitting their digital ID with embedded user data, the vendor system 130 can receive age verification information from the user device 110 without asking the user to verify the user's age.

Another advantage may be that a user may place an order with minimal inputs and may complete an order in a rapid manner. For instance, in some cases, if the digital ID is configured to automatically place an order with a particular vendor when a trigger event is triggered, the user may simply confirm the order with one input, and subsequently the order, along with payment information and user data, is transmitted by one touch of the user. By using a digital ID with verified user data for transactions with multiple vendors, a user may not have to repeatedly enter the same information (e.g., payment information, name, address information, etc.), and a vendor receiving the user's order can rely on the order as being valid because the user data received with the order has been verified by a trusted source as being valid.

After receiving the steganographic order from the user device 110, the digital ID reader 140 at the vendor system 130 transmits an acknowledgement message to the user device 110 indicating that the steganographic order has been received (180). In some implementations, if an acknowledgement message is not received from the digital ID reader 140 by the user device 110 within a particular time of transmitting the steganographic order, the user device 110 may retransmit the steganographic order to the digital ID reader 140 or display an error message to the user indicating that the steganographic order was not received by the vendor system 130.

After receiving the steganographic order, the digital ID reader 140 at the vendor system 130 de-embeds the data in the steganographic order (182). In general, various suitable methods may be used to de-embed the steganographic order. In some cases, if a key has been used to embed information into the digital ID, the key may be used by the digital ID reader 140 to de-embed the steganographic order. The digital ID reader 140 may receive information regarding the steganographic key from the digital ID system 120 or, in some cases, from the user device 110. The digital ID reader 140 may obtain user data and order information by de-embedding the steganographic order.

Although the obtained user data has been verified by a trusted third-party resource, in some cases, the vendor may want to verify the user data obtained from the digital ID. In such cases, the vendor system 130 may transmit a request to the digital ID system 120 to verify the identification of the user extracted from the user data (184).

The digital ID system 120 may then verify the user identification (185). For example, the user identification received from the digital ID reader 140 is sent to a secure server, which compares the received user identification to information stored in a verified and secure third-party resource/identification database (e.g., government-issued ID database, state Image servers, and driver's license database). If the comparison of received user identification and the information stored in the secure third-party resource/identification database satisfies a certain threshold (e.g., the user identification matches stored information in the secure third-party resource/identification database for more than a threshold percentage amount), the user's identification is verified as valid. If the comparison of received user identification and the information stored in the secure third-party resource/identification database does not satisfy a certain threshold (e.g., the user identification does not match stored information in the secure third-party resource/identification database for more than a threshold percentage amount), the user's identity is verified as invalid.

In some implementations, verification of the received user identification may be performed in the digital ID system 120.

The digital ID system 120 may then transmit verification information indicating whether the user information de-embedded from the digital ID by the digital ID reader 140 is verified as valid or not (186).

If the user information has been verified as being valid, the order information de-embedded from the steganographic order in the digital ID is processed (188). Processing of the order may vary based on the type of vendor. In general, processing of the order may include determining an item being ordered, determining a quantity of the item being ordered, determining the name of the user placing the order, determining any preferences associated with the user placing the order, determining if the user placing the order is a repeat customer, a priority customer, or a new customer, and providing the user with the order. In some cases, processing of the order also includes personalizing the order before completing the order and providing the user with the order.

For example, after determining a name of the user placing the order, the vendor system 130 may communicate with a customer database to obtain further information about the user. The further information obtained from the customer database may include information indicating whether the user is a preferred customer, a priority customer, a new customer, or a repeat customer. The customer database may also provide information on customer preferences. For example, if the vendor is a coffee shop, after obtaining information about a customer's name and an ordered drink from the steganographic order, the vendor system 130 at the coffee shop may communicate with its customer database to determine preferences of the customer, such as, for example, a preferred temperature of the drink ordered by the customer, and a quantity of sugar, cream, or milk preferred by the customer. In addition, when the drink is being prepared, an employee at the coffee shop may further personalize the drink by adding a name of the customer on the cup for the drink or any other signatures that may be customized for the customer.

In some implementations, if the vendor has a customer loyalty program, processing of the steganographic order may include updating the vendor's database to reflect another transaction of the user and the addition of rewards to the user's profile in the vendor's database according to the rules of the customer loyalty program.

After processing the steganographic order (188), the vendor may deliver the item ordered by the user and transmit an indication to the user device 110 that the steganographic order has been satisfied (190). For example, the item ordered may be delivered by mail, in-person, machines (e.g., drones), or through various other suitable means. The indication that the steganographic order has been completed may be transmitted through various suitable means including, for example, a text message, a phone call, and an audio announcement signal at the vendor that includes a name of the user or the order.

In some implementations, the user may provide an input at the user device 110 indicating that the order has been satisfied.

In some implementations, if a steganographic order is modified, cannot be completed, or canceled by the user or the vendor, the vendor system 130 may transmit a message to the user device 110 indicating that the order has been modified, cannot be completed, or canceled respectively. In some implementations, if the time since the steganographic order was transmitted to the digital ID reader 140 at the vendor system 130 satisfies a time period threshold and the order has not been completed within the time period threshold, the order is canceled and a message indicating the cancellation is transmitted to the user device 110.

Figure 2:
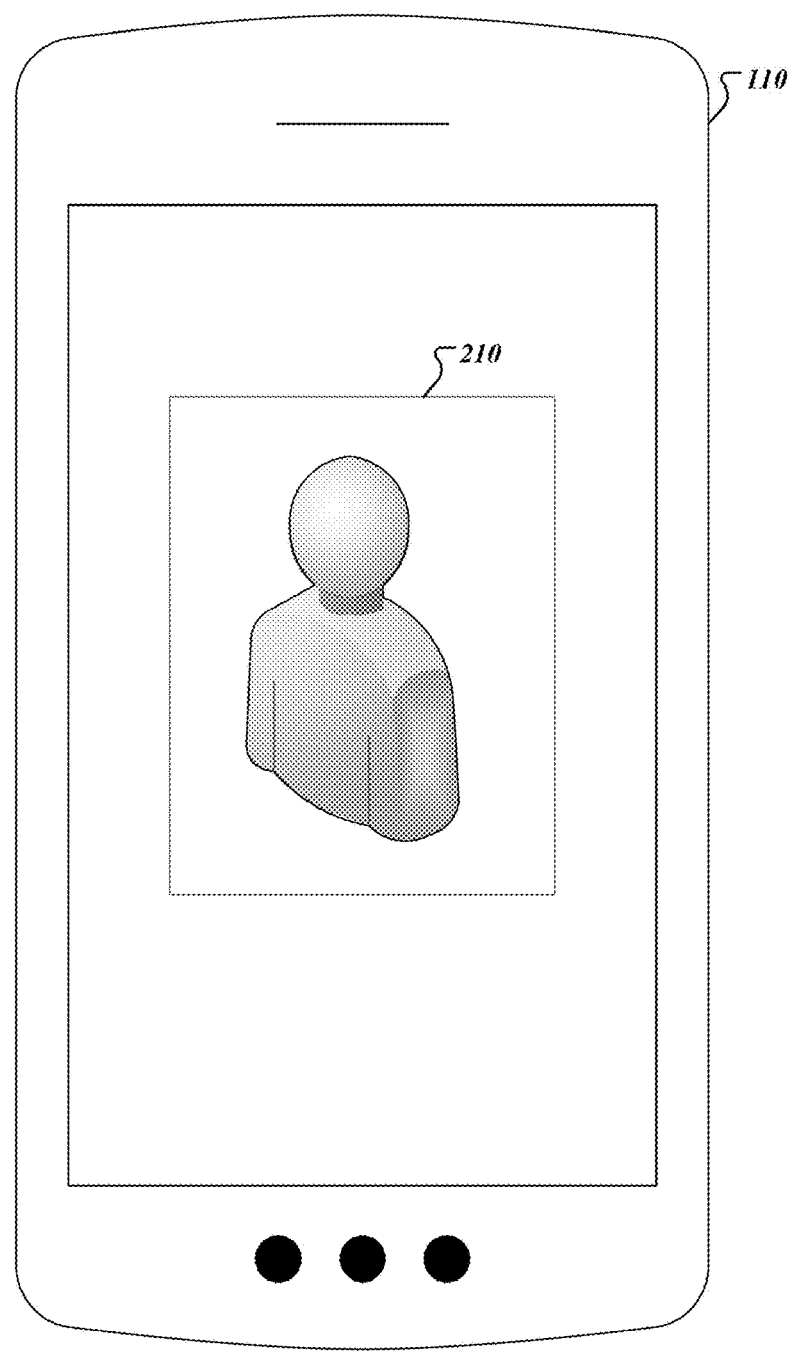
FIG. 2 depicts an image of a user device displaying a digital identification.

FIG. 2 displays an exemplary implementation of a digital ID 210 displayed by a user device 110. The digital ID 210 may include an image of the user or, in general, any image associated with the user of the user device 110. The image may be captured by the user device 110 or may be provided from a verified and secure third-party resource/identification database (e.g., government-issued ID database, state Image servers, driver's license database). As described above, when a stenographic order is generated, the image may be modified to embed order information. For example, an image for a first stenographic order may be different from an image for a second stenographic order, and both may be different in a manner that is not perceivable to the human eye from the original image.

In addition to the user image, the digital ID 210 may also include embedded data. The embedded data may include user data such as a name of the user, an age of the user, a sex of the user, a citizenship of the user, an address of the user, a passport number or social security number of the user, and, in general, any other personal data of the user. The embedded data may also include other information that the user has configured the digital ID for. For example, as described above, the digital ID may be configured with one or more of biometric data, security features, user preferences, preferred vendors, preferred payment processing options, vendor membership information, operation modes, and order information. Because the digital ID may be configured with a steganographic image, the information provided by the digital ID is embedded and is not visible to the human eye.

Figure 3:
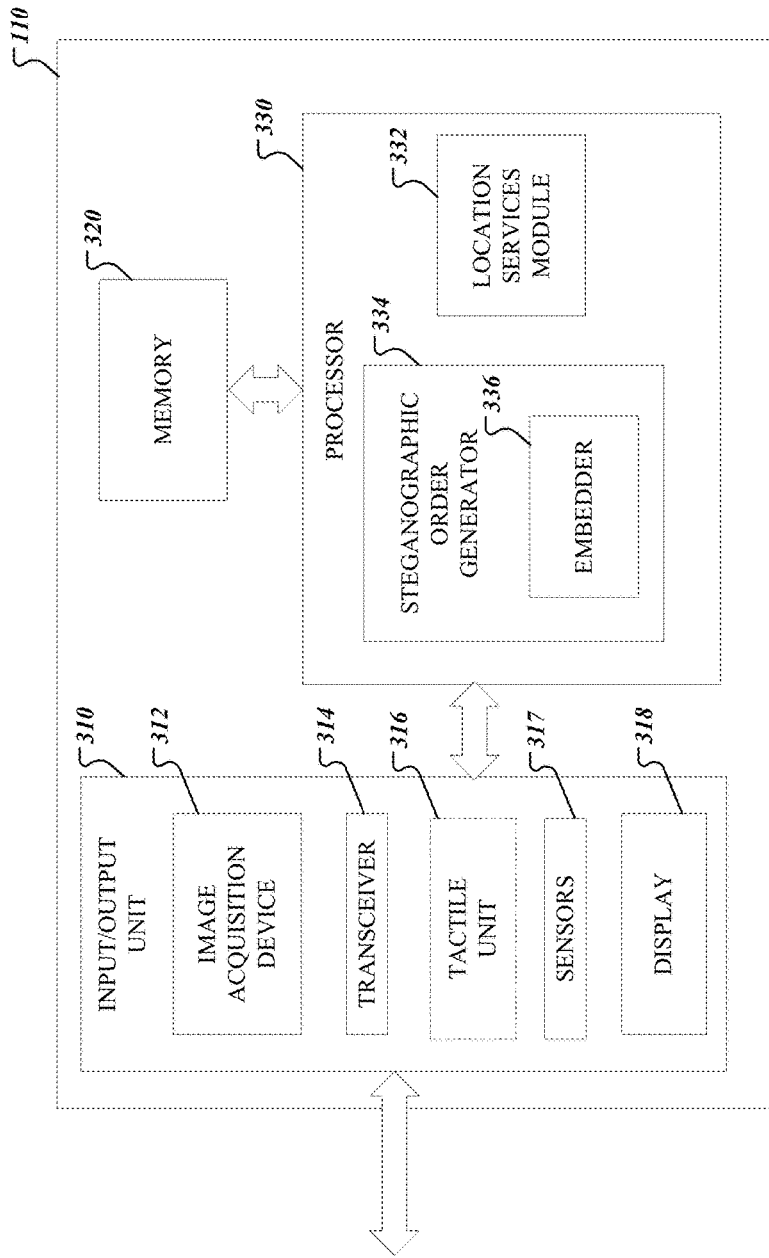
FIG. 3 depicts a block diagram of a user device.

FIG. 3 displays an exemplary implementation of a user device 110. In general, the user device 110 may include any suitable portable electronic device capable of communicating with a digital ID system 120 and a digital ID reader 140.

Examples of suitable portable electronic devices include, but are not limited to, a smart phone, computer, lap top, personal digital assistant, electronic pad, electronic notebook, smart television, a watch, and smart glasses.

The user device 110 includes an input/output (I/O) unit 310, a memory 320, and a processor 330. The I/O unit 310 includes an image acquisition device 312, a transceiver 314, a tactile unit 316, sensors 317, and a display 318. The processor 330 includes a location services module 332 and a steganographic order generator 334, which includes an embedder 336.

An image acquisition device 312 can be used to obtain an image though various suitable methods. In some implementations, the image acquisition device 312 may include a camera or optical sensor to capture an image of, for example, a user of the user device 110. In some implementations, the image acquisition device 312 may communicate with memory 320 or an external device through transceiver 314 to obtain an image.

A transceiver 314 includes a transmitter and a receiver and may be utilized to communicate with other devices. The transceiver 314 may include amplifiers, modulators, demodulators, antennas, and various other components. The transceiver 314 may communicate with the digital ID system 120 to obtain a digital ID. The transceiver 314 may transmit a steganographic order to the digital ID reader 140 and receive data from the digital ID reader 140. The transceiver 314 may direct data received from the digital ID reader 140 and the digital ID system 120 to other components of the user device 110 such as the processor 330 and memory 320.

One or more sensors 317, and optionally a tactile unit 316, may be included in the user device 110. The sensors 317 may include one or more of an optical sensor, capacitive sensor, charge-coupled device sensor, gyroscope, microphone, altimeter, impact sensor, piezoelectric sensor, motion sensor, biosensor, active pixel sensor, and various other sensors that may detect one or more conditions or receive input from the user. In some implementations, a keyboard for receiving alphanumeric text from the user may include one or more of the sensors 317 and tactile unit 316.

Display 318 may display various data to the user. For example, display 318 may be configured to display a digital ID, messages received from the digital ID system 120 and digital ID reader 140, or various other information to a user. The display 318 may be implemented through suitable display types including, for example, a projection display, a liquid crystal display (LCD), or light emitting diode (LED) display.

Memory 320 may include one or more mass storage devices, e.g., magnetic, magneto optical disks, optical disks, EPROM, EEPROM, flash memory devices, and may be implemented as internal hard disks, removable disks, magneto optical disks, CD ROM, or DVD-ROM disks for storing data. The memory 320 may store data for generating and updating a digital ID. The memory 320 may also store data associated with settings or a configuration of the digital ID. In some implementations, user data may be stored in an encrypted and unencrypted format. For example, personal data, such as a passport number or social security number, for which additional security may be desirable, may be stored in an encrypted format. Other personal information, such as a name of the user and a contact number of the user, may be stored in an unencrypted format. Various suitable encryption techniques may be used.

The processor 330 may be coupled to the memory 320 and the I/O unit 310, and may control the operations of the user device 110. The processor 330 may include various logic circuitry and programs to execute the various implementations described herein. For example, the processor 330 may control the operations of the user device 110 described in FIGS. 1A-1C above. The processor 330 includes a location services module 332 and a steganographic order generator 334.

The location services module 332 may determine a location of the user device 110 in real-time or on a periodic basis. In general, various suitable location determining techniques and systems, such as Global Positioning System (GPS), All Source Positioning and Navigation (ASPN), Global Navigation Satellite System (GLONASS), and General Packet Radio Service (GPRS)-based location services may be used by the location services module 332 to determine a location of the user device 110. When the location services module 332 determines that the current location of the user device 110 matches a location corresponding to a trigger event, the location services module 332 may generate an indication (e.g., alert signal) that the trigger event is to be executed. For example, a digital ID may be configured for a trigger event such that an order is placed when the user device 110 is within a particular distance of a particular vendor. Accordingly, when the location services module 332 determines that a location of the user device 110 is within the particular distance of the particular vendor, the location services module 332 provides an alert signal to the steganographic order generator 334 and the processor 330 to generate an order and transmit the order to the particular vendor.

In some implementations, the location services module 332 receives information and updates associated with user preferences and digital ID configurations so that the location services module 332 may provide an alert signal according to user preferences and the digital ID configuration. The location services module 332 may also support other location based applications and functions of the user device 110.

The steganographic order generator 334 includes an embedder 336 and is configured to generate a steganographic order based on the user's digital ID and order information. For example, the steganographic order generator 334 may receive: order information through one of the tactile unit 316, sensors 317, or display 318; an image used by the digital ID from one of transceiver 314, image acquisition device 312, or memory 320; and user data from memory 320 or transceiver 314. The embedder 336 may then embed the user data and order information into the digital ID image using any suitable steganographic method. As described above, various suitable steganographic methods and tools may be used to embed the order information and user data into the digital ID image including, but not limited to, least-significant bit (LSB), masking, filtering, and transformation techniques. The generated steganographic order embedded into the digital ID image may then be displayed by display 318 or transmitted via transceiver 314 to the digital ID reader 140 at the vendor system 130.

Figure 4:
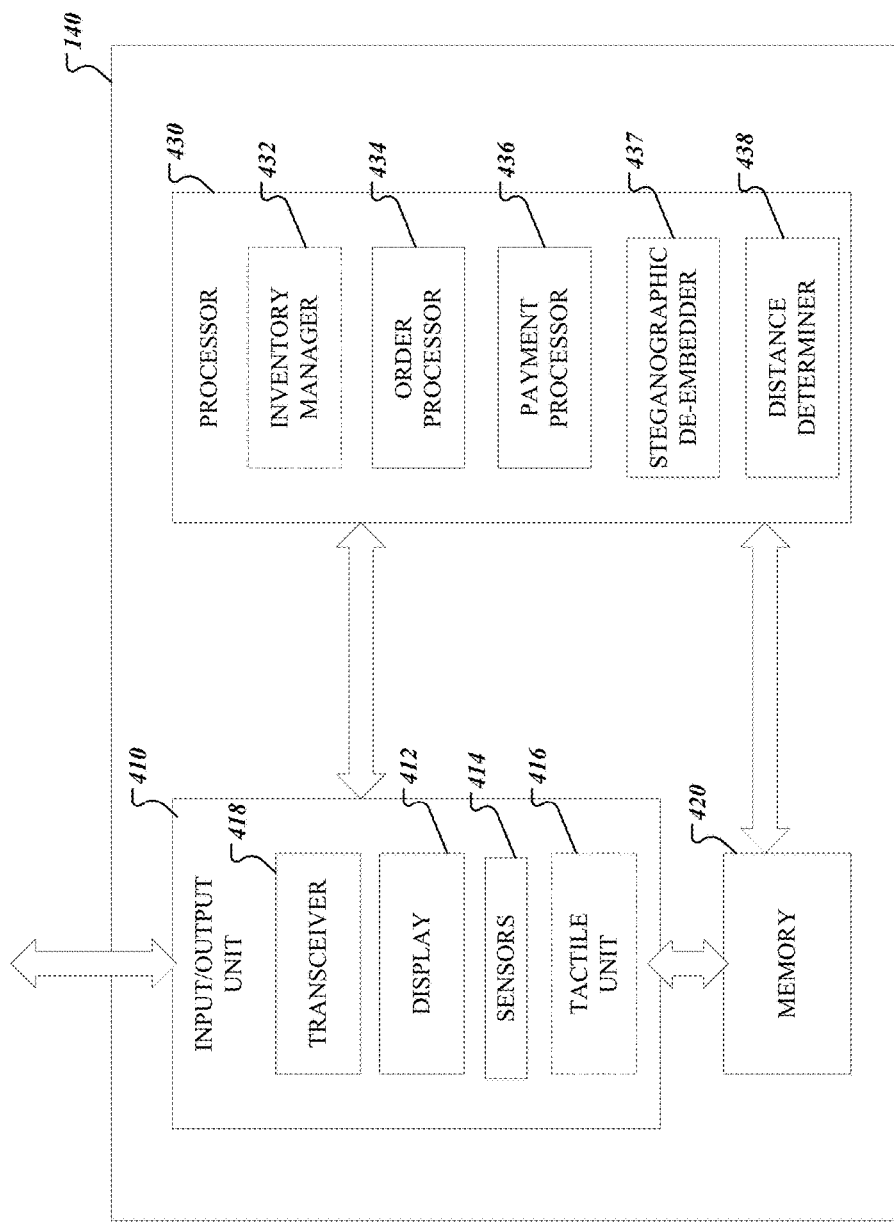
FIG. 4 depicts a block diagram of a digital identification reader.

FIG. 4 displays an exemplary implementation of a digital ID reader 140. The digital ID reader 140 includes or is coupled to one or more of an input/output (I/O) unit 410, a memory 420, and a processor 430. The I/O unit 410 includes a transceiver 418, a display 412, sensors 414, and, in some cases, a tactile unit 416. The processor 430 includes an order processor 434, a payment processor 436, a steganographic de-embedder 437, a distance determiner 438, and, in some cases, an inventory manager 432.

Transceiver 418 includes a transmitter and a receiver and is utilized to communicate with other devices and systems, such as a user device 110 and a digital ID system 120. The transceiver 418 may include amplifiers, modulators, demodulators, antennas, and various other components. The transceiver 418 may receive a steganographic order from the user device 110, and transmit one or more messages to the digital ID system 120 and the user device 110. The transceiver 418 may direct data received from the user device 110 and the digital ID system 120 to other components of the digital ID reader 140 such as the processor 430 and memory 420.

Display 412 may display various data at the vendor system 130. For example, display 412 may be configured to display a digital ID with an embedded steganographic order, messages received from the digital ID system 120 and user device 110, order information, or various other information associated with an order. The display 318 may be implemented through suitable display types including, for example, a projection display, a liquid crystal display (LCD), or light emitting diode (LED) display.

One or more sensors 414 and a tactile unit 416 may be implemented separately or within display 412. In some implementations, a keyboard for receiving alphanumeric text from the vendor may be implemented using any combination of the display 412, sensors, and tactile unit 316. In some implementations, the tactile unit 414 may include a touch pad configured to detect a touch or input by a vendor. The sensors 317 may include one or more of an optical sensor, capacitive sensor, charge-coupled device sensor, gyroscope, microphone, altimeter, impact sensor, piezoelectric sensor, motion sensor, biosensor, active pixel sensor, and various other sensors that may detect one or more conditions or receive input from the user. In some implementations, the sensors 414 may include an optical scanner for scanning a digital ID displayed by a user device 110.

Memory 420 may include one or more mass storage devices, e.g., magnetic, magneto optical disks, optical disks, EPROM, EEPROM, flash memory devices, and may be implemented as internal hard disks, removable disks, magneto optical disks, CD-ROM, or DVD-ROM disks for storing data. The memory 420 may store data associated with processing orders, payments, and inventory. The memory 420 may also store data associated with the vendor such as, for example, a vendor name, a registration of the vendor, a tax number of the vendor, and, in general, any information that may identify the vendor. The memory 420 may also store digital ID reader configuration data such as data indicating a particular type of customer or particular products/services from which steganographic orders can be received.

The processor 430 may be coupled to the memory 420 and the I/O unit 410, and may control the operations of the user device 110. The processor 430 may include various logic circuitry and programs to execute the various implementations described herein. For example, the processor 430 may control the operations of the digital ID reader 140 described in FIGS. 1A-1C above. The processor 430 includes an order processor 434, a payment processor 436, a steganographic de-embedder 437, a distance determiner 438, and in some cases, an inventory manager 432.

After receiving a digital ID with an embedded steganographic order via the transceiver 418 or sensors 414, the steganographic de-embedder 437 de-embeds steganographic order from the digital ID to extract user data and order information. In general, various suitable methods may be used to de-embed the steganographic order. In some cases, if a key has been used to embed information into the digital ID, the key may be used by the digital ID reader 140 to de-embed the steganographic order. In some cases, the digital ID reader 140 may receive information regarding the steganographic key from the digital ID system 120 or the user device 110.

The order processor 434 operates in conjunction with the payment processor 436, the distance determiner 438, and, optionally, the inventory manager 432 to process the order. For example, the order processor 434 may send payment information obtained from the steganographic order to the payment processor 436. The payment processor 436 may process the payment information to complete payment for the order. For example, if the payment information includes credit card information to pay for the order, the payment processor 436 will submit the credit card information to a credit card processor to charge the credit card for payment of the order. If payment for the order cannot be completed, the payment processor 436 generates a message that the transaction failed, and subsequently transceiver 418 may transmit a message to the user device 110 indicating that the order has been canceled or could not be completed due to a payment failure.

If payment for the order is completed, the order processor 434 may send a query to the inventory manager 432 to determine if an item being ordered is still in the inventory. If the item is no longer in the inventory, the inventory manager 432 may generate a message that the transaction failed, and subsequently transceiver 418 may transmit a message to the user device 110 indicating that the order has been canceled or could not be completed due to the item being out of stock. If the item is still in inventory, the inventory manager 432 deducts the amount of the item in the inventory by the amount of the item being ordered in the steganographic order, and sends an indication to the order processor 434 that the quantity of items ordered is available.

In some implementations when the user has configured the user's digital ID to operate in one of several modes, such as a first mode, second mode, or third mode, as described above, information regarding the mode is also transmitted in the steganographic order. Accordingly, when the order processor 434 receives information from the de-embedded steganographic order, the order processor 434 determines which mode the steganographic was placed in. If the order was placed in the first mode or second mode, the order processor 434 provides information regarding the mode to the distance determiner 438. The distance determiner 438 may determine the distance at which the distance threshold was set in the first or second mode, and may determine a corresponding time to complete the order associated with the distance.

For example, if the user configured the order in the first mode, which automatically triggers an order when the user device 110 is within, e.g., 0.5 miles of a particular vendor, the distance determiner 438 in the digital ID reader 140 may determine a distance that the user device 110 is from a location of the particular vendor when the order was placed. Based on the determined distance, the distance determiner 438 may also determine a proximate time at which a user may arrive at the vendor location based on current road, traffic, and weather conditions. The proximate time may be used to determine a priority order to complete orders at the vendor. For example, an order from a first user, who placed the order before a second user with the vendor, may be placed after the second user's order in a priority list to complete orders at the vendor because the second user is expected to arrive at the vendor before the first user based on the determined distance and times for the first and second user.

In some implementations, the order processor 434 may communicate with a customer database directly or through the digital ID system 120 to inquire about user preferences. For example, if a user places an order for a particular item (e.g., coffee), the digital ID reader 140 may communicate with a customer database to determine how to personalize (e.g., amount of sugar or cream) the order for the customer. In addition, if the user has a customer profile or is a member of the vendor, the order processor 434 may update the customer database with information regarding the order so that an updated record of the customer's choices and preferences is maintained.

After processing, personalizing, and completing the order, the order processor 434 may transmit a message to the user device 110 via transceiver 418 indicating that the order has been satisfied. In some cases, if an order is canceled or modified, the order processor 434 may also transmit a message to the user device 110 via transceiver 418 to provide a status (e.g., canceled, modified) of the order.

Figure 5:
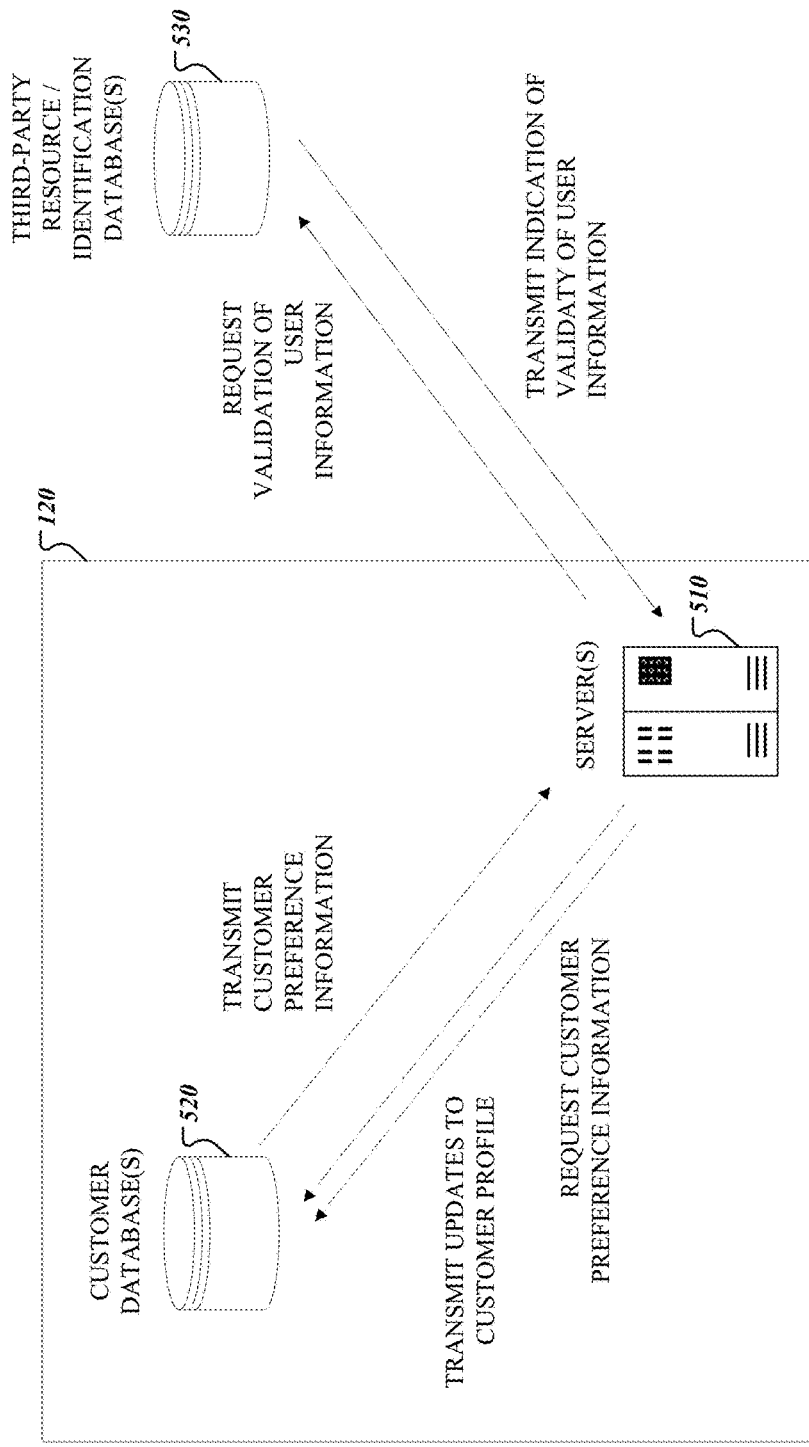
FIG. 5 depicts a diagram illustrating a digital identification system and a third-party verification system.

FIG. 5 displays an exemplary implementation of a digital ID system 120 and a third-party resource/identification database 530. The digital ID system 120 may include one or more networks. In general, the one or more networks may include and implement any secured network architectures including those defined by bodies, such as the Global System for Mobile communication (GSM) Association, the Internet Engineering Task Force (IETF), and the Worldwide Interoperability for Microwave Access (WiMAX) forum. For example, the one or more networks may implement one or more of a GSM architecture, a General Packet Radio Service (GPRS) architecture, a Universal Mobile Telecommunications System (UMTS) architecture, and an evolution of UMTS referred to as Long Term Evolution (LTE). The one or more networks may implement a WiMAX architecture defined by the WiMAX forum or a Wireless Fidelity (WiFi) architecture. The one or more networks may include, for instance, a local area network (LAN), a wide area network (WAN), the Internet, a virtual LAN (VLAN), an enterprise LAN, a layer 3 virtual private network (VPN), an enterprise IP network, or any combination thereof.

The one or more networks may include one or more databases, access points, servers, storage systems, cloud systems, and modules. For instance, the one or more networks may include one or more servers 510, which may include any suitable computing device coupled to the one or more networks, including but not limited to a personal computer, a server computer, a series of server computers, a mini computer, and a mainframe computer, or combinations thereof. The one or more servers 510 may be a web server (or a series of servers) running a network operating system, examples of which may include but are not limited to Microsoft® Windows® Server, Novell® NetWare®, or Linux®. The one or more servers 510 may be used for and/or provide cloud and/or network computing. The one or more servers 510 may have connections to external systems providing messaging functionality such as e-mail, SMS messaging, text messaging, and other functionalities, such as advertising services, search services, etc.

The databases in the digital ID system 120 may include a cloud database or a database managed by a database management system (DBMS). A DBMS may be implemented as an engine that controls organization, storage, management, and retrieval of data in a database. DBMSs frequently provide the ability to query, backup and replicate, enforce rules, provide security, do computation, perform change and access logging, and automate optimization. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

In some implementations, the databases in the digital ID system 120 include a customer database 520. The customer database stores customer information of one or more vendors. The customer information may include information such as a membership number, a priority rank of the customer, customer preferences and taste profile, customer payment and order history, customer address, and vendor deals or promotions offered to the customer. In some cases, when the digital ID system 120 receives queries regarding a user from the digital ID reader 140, the one or more servers 510 may query the customer database 520 to provide the requested information. In some cases, the one or more servers 510 may send updates to the customer database 520 based on updated order information received from the digital ID reader 140.

In some implementations, the customer database 520 is not included in the digital ID system 120, but is connected to the digital ID system 120.

The one or more servers 510 may also communicate with third-party resources/identification databases 530. The third-party resource/identification database 530 may be any trusted and reliable source of identity verification, such as for example, a government-issued ID database, state image servers, and a driver's license database. When the one or more servers 510 receive a verification request from the user device 110 or the vendor system 130, the one or more servers 510 may send identification data in the verification requests to the third-party resource/identification database 530. The third-party resource/identification database 530 compares the provided identification data to information stored in its database 530. If the comparison of provided identification data and the information stored in the database 530 satisfies a certain threshold (e.g., the identification data matches stored information in the database 530 for more than a threshold percentage amount), the identification data is verified as valid. If the comparison of the provided identification data and the information stored in the database 530 does not satisfy a certain threshold (e.g., the identification data does not match stored information in the database 530 for more than a threshold percentage amount), the identification data is verified as invalid. An indication of the validity of the identification data is then transmitted to the one or more servers 510, which subsequently responds to the verification request received from the user device 110 or vendor system 130.

It should be understood that various secure data transmission methods may be used to implement communications between the user device 110, digital ID system 120, and vendor system 130, and between the networks and databases within the digital ID system 120.

Figure 6:
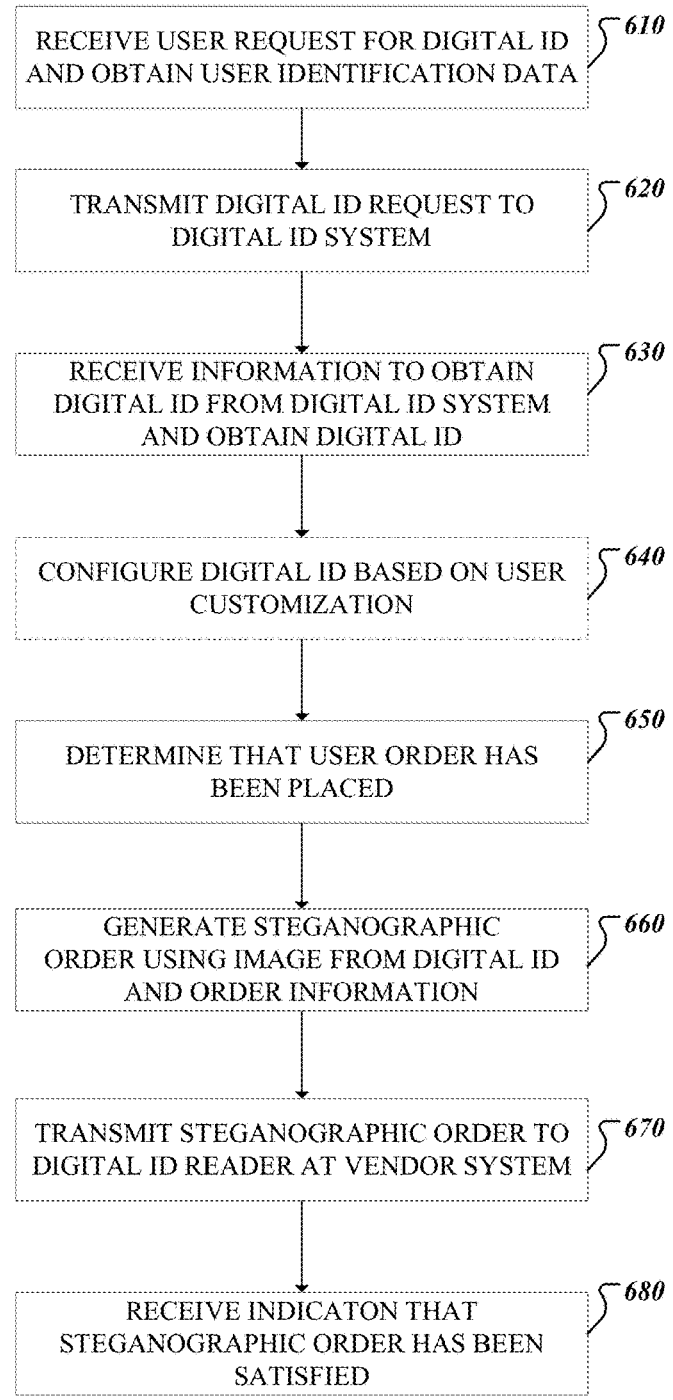
FIG. 6 depicts a flowchart illustrating a method for implementing a steganographic order at a user device.

A method for implementing a steganographic order at the user device 110 is now described with reference to FIG. 6.

The user device 110 receives a request from the user to obtain a digital ID (610). The request may be input through various suitable means including, for example, through an audio command received from the user requesting a digital ID or an input received through a mobile application or a graphical user interface indicating that the user would like to receive a digital ID. The request for a digital ID may be received after the user enrolls into a program to receive personalized and enhanced customer services at one or more vendors as described above.

In response to receiving the user request, the user device 110 may display one or more graphical user interfaces to obtain user identification data from the user to help verify the user's identity (610). The user identification data may include, but is not limited to, one or more of an image of the user, an image of the user's iris, an image of the user's passport or driver's license, a finger print, a date of birth, a residential address, biometric and demographic information, and, in general, any data that may provide information on an identification of the user. In some cases, the user identification data may also include an individual identification number or a membership number used by a particular vendor to identify the user.

After receiving the user identification data, the user device 110 generates a digital ID request message inclusive of the user identification data and transmits the request message to the digital ID system 120 (620).

After the digital ID system 120 verifies that the user identification data sent in the request message is valid, the user device 110 may receive instructions for obtaining the digital ID from the digital ID system 120 and subsequently the user device 110 obtains the digital ID for the user (630). For example, a file, link, or interface corresponding to the digital ID may be transmitted to the user device 110 via e-mail or any other secure messaging means. A user may elect to download the file or select the link to obtain the digital ID using the user device 110.

After receiving the digital ID, the user may optionally choose to configure the digital ID through the user device 110 (640). As described above, the user device 110 may configure or personalize the digital ID based on user selection of various features including, for example, security features, vendor connections, and user preferences.

After the digital ID has been obtained and configured, the user device 110 may determine that order information has been received from the user (650). The user may input order information using the user device 110 using various suitable means. For example, in some implementations, the user device 110 may receive an order from the user through an application specific to a particular vendor. In some implementations, the user device 110 may determine that an order has been placed when the user places an order though a web portal on the user device 110. In some implementations, the user device 110 may receive a user selection of one or more options displayed using the digital ID to select a vendor and a frequently-ordered item of the vendor. In some implementations, the user device 110 determines that an order has been placed based on a trigger event configured to place an order, as described above.

Figure 7:
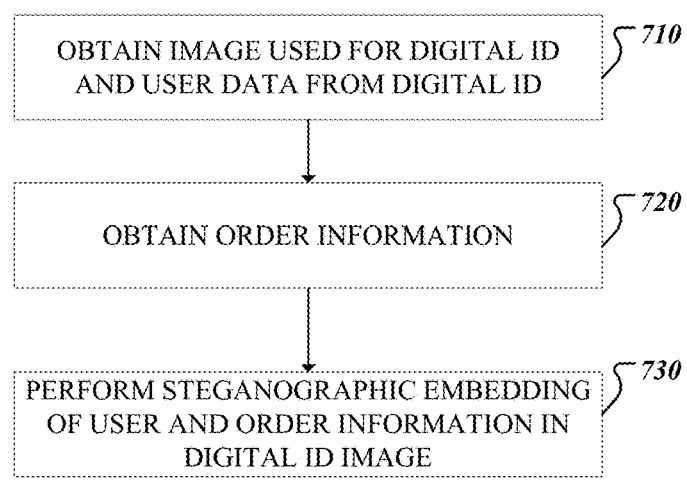
FIG. 7 depicts a flowchart illustrating a method for generating a steganographic order.

When the order is determined to have been placed, the user device 110 generates a steganographic order using an image from the user's digital ID and the order information (660). FIG. 7 shows the actions taken for generating the steganographic order.

Referring to FIG. 7, the user device 110 may obtain the image used by the digital ID and extract user data from the digital ID (710). The extracted user data may include, for example, a name of the user, an age of the user, preferred payment information of the user, an address of the user, and, in general, any other personal data of the user that may be used by the vendor for processing the order. As noted above, the image used by the digital ID may be an image provided by the user or by a secure third-party resource/identification database. In some implementations, the image may be a picture of the user.

Next, the user device 110 obtains the order information for the order that has been (720). The order information may include, for example, one or more of a name of a vendor, an item (e.g., product or service) being ordered, a quantity of the item being ordered, and, in general, any other information (e.g., vendor address) that may be helpful to place an order.

The order information and user data are then embedded into the image used by the digital ID to generate a steganographic order such that the digital ID embeds the steganographic order (730). In general, various suitable steganographic methods and tools may be used to embed the order information and user data into the digital ID image. For example, least-significant bit (LSB), masking, filtering, and transformation techniques may be used to embed data in the digital ID image. The steganographic embedding may be performed such that the digital ID image appears to be unaltered to a human eye, and the order information and the user identification information is not visible to the human eye.

Referring back to FIG. 6, after using one or more steganographic methods or tools to generate a steganographic order by embedding the order information and user data into the image used by the digital ID (660), the user device 110 transmits the steganographic order to the digital ID reader 140 at the vendor system 130 using the digital ID (670). As described above, the steganographic order the may be transmitted wirelessly to the digital ID reader 140, for example, through a wired or wireless network, or the steganographic order may be shown to the vendor.

After transmitting the steganographic order, the user device 110 receives an indication that the steganographic order has been satisfied (680). The indication that the steganographic order has been satisfied may be received through various suitable means including, for example, a text message, a phone call, and an audio announcement signal at the vendor that includes a name of the user or the order. In some implementations, the user device 110 may receive an input from the user that the order has been satisfied.

In some implementations, if a steganographic order is modified, cannot be completed, or canceled by the user or the vendor, the vendor system 130 may transmit a message to the user device 110 that the order has been satisfied by indicating that the order has been modified, cannot be completed, or canceled respectively. In some implementations, if the time since the steganographic order was transmitted to the digital ID reader 140 at the vendor system 130 satisfies a time period threshold and the order has not been completed within the time period threshold, the order is canceled and a message indicating the cancellation is transmitted to the user device 110.

Figure 8:
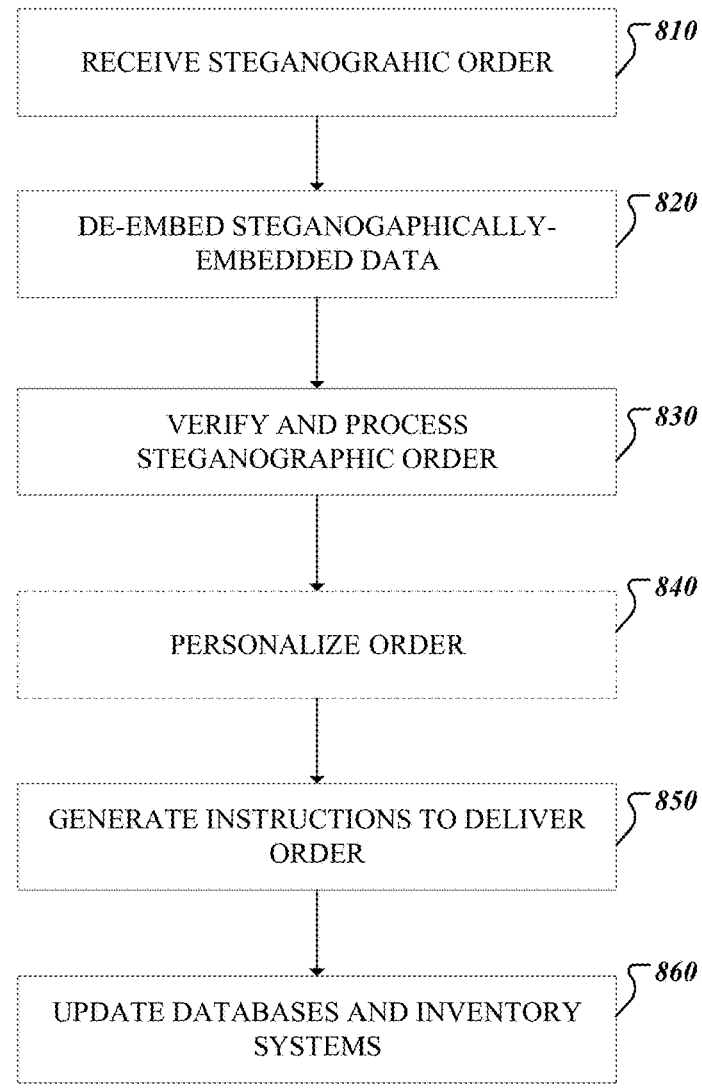
FIG. 8 depicts a flowchart illustrating a method for processing a steganographic order at a digital identification reader.

A method to process a steganographic order by the digital ID reader 140 at the vendor system 130 is now described with reference to FIG. 8.

The digital ID reader 140 receives a steganographic order from a user device 110 (810), and transmits an acknowledgement message back to the user device 110 to acknowledge receipt of the steganographic order.

After receiving the steganographic order, the digital ID reader 140 de-embeds the steganographically-embedded data in the steganographic order (820). As described above, various suitable methods may be used to de-embed the steganographic order. In some cases, the digital ID reader 140 may use a steganographic key to de-embed the steganographic order. The digital ID reader 140 may obtain user data and order information by de-embedding the steganographic order.

Next, the digital ID reader 140 verifies and processes the user data and order information (830). As described above, in some cases, the digital ID reader 140 may communicate with the digital ID system 120 to verify the user data obtained from the digital ID. The digital ID reader 140 may process the order information based on the type of vendor. In general, processing of the order information may include one or more of determining an item being ordered, determining a quantity of the item being ordered, determining the name of the user placing the order, determining any preferences associated with the user placing the order, determining if the user placing the order is a repeat customer, a priority customer, or a new customer, and providing the user with the order. In addition, as described above, processing of the order also includes determining an availability of the item ordered and processing payment information included in the steganographic order to complete a payment of the order.

In some implementations, the digital ID reader 140 may optionally control personalization of the order for the user during the processing of the order information or subsequent to the processing (840). For example, after determining a name of the user placing the order, the digital ID reader 140 may communicate with a customer database to obtain further information about the user. The further information obtained from the customer database may include information indicating whether the user is a preferred customer, a priority customer, a new customer, or a repeat customer. The customer database may also provide information on customer preferences. For example, if the vendor is a coffee shop, after obtaining information about a customer's name and an ordered drink from the steganographic order, the digital ID reader 140 may communicate with its customer database to determine preferences of the customer, such as, for example, a preferred temperature of the drink ordered by the customer, and a quantity of sugar, cream, or milk preferred by the customer. In addition, when the drink is being prepared, the digital ID reader 140 may generate a message for an employee at the coffee shop to further personalize the drink by adding a name of the customer on the cup for the drink or any other signatures that may be customized for the customer.

After processing and/or personalizing the steganographic order (830 and 840), the digital ID reader 140 generates instructions for the vendor to deliver the item ordered by the user and transmit an indication to the user device 110 that the steganographic order has been satisfied (850). For example, the item ordered may be delivered by mail, in-person, machines (e.g., drones), or through various other suitable means. The indication that the steganographic order has been completed may be transmitted through various suitable means including, for example, a text message, a phone call, and an audio announcement signal at the vendor that includes a name of the user or the order.

After delivering the order, the digital ID reader 140 updates an inventory system of the vendor and any related databases, such as a customer database (860). For example, the inventory manager 432 may update the vendor's inventory by deducting the vendor's inventory by the quantity of the item ordered in the steganographic order. In some implementations, if the vendor has a customer loyalty program, the digital ID reader 140 may update the vendor's customer database to reflect another transaction of the user and/or add rewards to the user's profile in the vendor's customer database according to the rules of the customer loyalty program.

Figure 9:
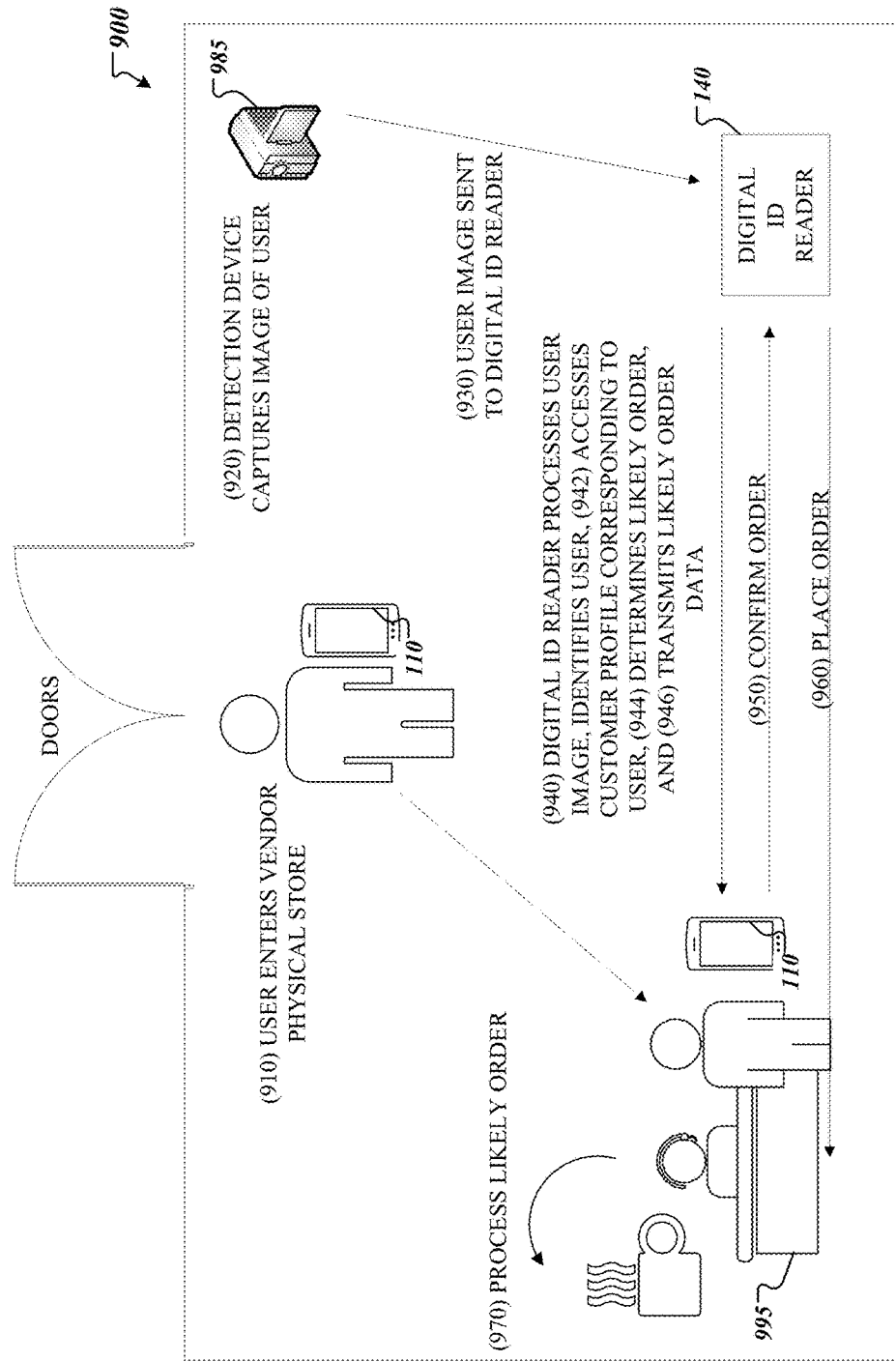
FIG. 9 depicts an exemplary method for ordering an item using a user recognition program.

In some implementations, a user may also elect to enroll in a user recognition program when configuring the user's digital ID. FIG. 9 depicts an exemplary method 900 for ordering an item using a user recognition program and exemplifies the benefits of enrolling into a user recognition program. As noted above, enrollment into the user recognition program may give authorization to a vendor to use a detection device (e.g., camera) at the vendor location to detect the presence of the user at the vendor location, and obtain information associated with the user in response to detecting the presence of the user at the vendor location.

Referring to FIG. 9, a visitor may enter a physical store of a vendor without providing any previous indication of a visit (910). A detection device 985 at the vendor's physical store may detect the entry of the visitor through various suitable means (920). For example, in some implementations, a camera may be monitoring people entering or leaving the vendor's physical store and may record the entry of the visitor. In some implementations, a biometric scanner (e.g., fingerprint scanner, iris scanner, or any other suitable device for obtaining biometric information of a visitor) may be used as a detection device 985.

The visitor's captured image or captured biometric information is then transmitted to the digital ID reader 140 at the vendor system 130 (930). The digital ID reader 140 may use one or more of various suitable facial recognition methods to obtain a facial image of the visitor (940). The facial image or biometric data is cross-referenced with a database of the vendor's customers who have enrolled into the user recognition program with the vendor. The digital ID reader 140 may communicate with the digital ID system 120 and/or customer database 520 to cross-reference the visitor's face or biometric data.

If the visitor's face or biometric data matches a facial profile or biometric data, respectively, of a user who has enrolled into the user recognition program, the digital ID reader 140 may access a customer profile of the visitor (942). In some cases, the customer profile of the visitor may include information collected by the vendor about the visitor such as the visitor's order history. In some cases, the customer profile of the visitor may include information provided by the user's digital ID. In particular, when a user enrolls into the user detection program for a specific vendor, the user's digital ID may be transmitted to the digital ID reader 140 of the specific vendor with information that the user has entered for the specific vendor. In this manner, the user's vendor-specific configuration of the digital ID, which may include only information that the user is willing to share with the specific vendor, is transmitted and shared with the specific vendor. As described above, digital ID data provided to a vendor may include various data including, for example, payment information, user name, preferred vendor items, etc. In some implementations where the digital ID reader 140 obtains the customer profile of the visitor based on information collected by the vendor about the visitor, the digital ID reader 140 may obtain order data including, for example, payment information, user name, and preferred vendor items based on the customer's order history stored in the customer profile of the visitor maintained by the vendor.

Based on the accessed customer profile and one or more rules, the digital ID reader 140 may determine a likely order that the visitor would like to place (944). For instance, in some cases, the digital ID reader 140 may determine the time of day and the day of the week that the visitor is visiting, and determine, using the customer profile of the visitor, if there is an item that the visitor most frequently orders at the day and time that the user is visiting. In some cases, the visitor's customer profile may explicitly indicate a particular item to be ordered when visiting the vendor. Accordingly, the digital ID reader 140 may select the indicated item as the likely order that the visitor would like to place. In general, various suitable methods may be used to determine the likely order that the visitor would like to place.

In some implementations, the digital ID reader 140 transmits a message to the user device 110 with the order data indicating the likely item that the visitor would like to order and requests a confirmation of the order (946). The digital ID reader 140 can obtain contact information for communicating with the user device 110 from the visitor's digital ID or customer profile.

The user device 110 may respond affirmatively or negatively to the request for order confirmation (950). If a negative response or no confirmation is received within a threshold period of time (e.g., 5 minutes), the digital ID reader 140 determines that the visitor is not interested in placing an order. If an affirmative response is received to the request for order confirmation, the digital ID reader 140 places an order in the vendor system 130 (960).

An order counter 995 at the vendor may process the order 970 and may arrange for delivery of the ordered item to the visitor. For example, in FIG. 9, the likely order the visitor wants is coffee. The order counter 995 may arrange to have an employee deliver the coffee or may call a name of the visitor and request the visitor to come to the order counter 995 to pick up the visitor's coffee.

Actions 910 to 960 may occur very rapidly. Thus, it is possible at certain vendor locations that actions 910 to 960 may occur between the time a visitor enters a building of the vendor and the time the visitor has reached an order counter or has been seated. This provides greater user convenience and is a motivation for users to enroll in the user detection program. Examples of this user convenience can be illustrated by the following examples.

In one exemplary scenario, a sports fan may enter a stadium. When the sports fan scans his ticket or a camera detects the sports fan passing a ticket gate of the stadium, a vendor system at the stadium can determine whether the sports fan is enrolled in the user recognition program and deliver the sports fan's favorite drink and snacks to his seat by the time or shortly after the sports fan gets seated.

In another exemplary scenario, a user may enter a coffee shop. A camera at the coffee shop may obtain a facial image of the user, and the digital ID reader at the coffee shop processes the facial image to obtain the user's favorite coffee if the user is enrolled into the user recognition program at the coffee shop. By the time the user gets seated or reaches the order counter, the user's order may already have been completed and the user can benefit from faster and more convenient service.

Implementations described above provide several advantages for users (e.g., customers) and vendors. For example, through use of the digital ID, a vendor may benefit from faster transactions of orders as well as having the benefit of verified identities of customers. The user also benefits because the user no longer has to pull up emails on their portable electronic device, carry a print out of the order, or try to access a web page reflecting their order when visiting a vendor.

An additional benefit for the users and vendors is that the digital ID may function as a discrete age verifier when needed. When the digital ID is being issued, a user's age is verified so that the digital ID includes verified age information of the user. The user's age may or may not be displayed by the user device according to the user's choice. If the user is in a situation where the user needs to verify that the user is within a certain age group, the digital ID may be used, without necessarily showing the user's age, to verify that the user is within a certain age group. As an example, if the user attempts to purchase an alcoholic beverage from a store and the user approaches the store (e.g., trigger event), the user device may send one or more signals to the store that the user would like to purchase a particular alcoholic drink from the store. The one or more signals may also contain signals for making a payment for the drink and a verification that the user is older than a restricted age (e.g., 21) without specifying the exact age of the user. When the user enters the store and uses the digital ID to establish the user's identity, the store would have already verified the user's age, received payment from the user, and may have already completed the user's order. Accordingly, the transaction for purchasing age-restricted goods may be much smoother, less intrusive, and faster through use of the digital ID.

The digital ID may also provide, in an anonymous manner, information of the user to vendors that have been visited by the user or which may interest the user. For instance, the digital ID may send demographic information of the user to a server of the vendor. Using this information, the vendor may understand the types of customers interacting with the vendor. The vendor may also provide promotional material or offers to the user based on the provided demographic information. For example, if information on a general geographic area (e.g., city or state) in which the user is located in is provided to the vendor, a server of the vendor may send the user's portable electronic device promotions that may be available for the general geographic area of the user. In another example, promotions or services associated with a general age group of the user may be sent to the user's portable electronic device.

It should be understood that the digital ID may be used for various reasons. For example, the digital ID may be used to verify a person's identity at various retail locations (e.g., alcohol stores, gun stores, coffee shops), airports, banking locations (e.g., bank offices, lender and other financial offices), medical institutions (e.g., doctor's offices, hospitals) and government offices (e.g., post office). In some cases, a user may use the digital ID to access privileged or restricted services and/or information. In general, the digital ID may be used for any purpose desired by a person identified by the digital ID.

In addition, although the implementations noted above have been described using an embedded image, an audio signal encoded with a steganographic order may be transmitted by a user device 110 instead of a digital ID including a steganographic image. The audio signal may be encoded with user data and order information in a similar manner as the embedding of data into the digital ID image. Upon receiving the audio signal, a digital ID reader 140 may decode the information included in the received audio signal and process the decoded information in a manner similar to the de-embedded data extracted from a received digital ID image.

Hereinafter, an exemplary scenario where a user uses a digital ID at a popular franchise restaurant and a banking office are described. In the exemplary scenario, a user has set the threshold distance for a trigger event to be 0.1 miles in the digital ID, and has set mode 1 for popular franchise restaurants and mode 2 for banking offices. Further, the user has configured a digital ID with information regarding his favorite menu item at the franchise restaurant.

When the user is within 0.1 miles of a location of the franchise restaurant, the digital ID may send one or more signals from the user's device to a digital ID reader at the franchise restaurant. The one or more signals includes a steganographic order that has embedded data such as an order for the user's favorite menu item, a payment for the order, and user data (e.g., name, address, demographic information, phone number, etc.). When the user arrives at the location of the franchise restaurant, the user will not have to wait in line at the drive in or wait in line to place an order inside the store. Instead, the user can simply go up to the counter, show the user's digital ID (if needed), pick up the user's order, and leave if the order is ready by the time the user arrives.

The franchise restaurant may also receive information about the user, which the franchise restaurant may use to personalize the order for the user and provide enhanced customer service. For example, the franchise restaurant may write the user's name on the order or be ready to receive someone that matches the name or demographic information provided by the one or more received signals. The franchise restaurant may conduct transactions for orders much faster and in a personalized manner which may lead to greater customer appreciation. Furthermore, the franchise restaurant can use this information to create more accurate customer records.

After leaving the franchise restaurant, the user may visit a banking office to withdraw some money. When the user is within 0.1 miles of the location of the banking office, the digital ID causes the user's device to display a message asking the user what he would like to do at the bank. The user may respond through any suitable means (e.g., tactile, audio) and indicate that the user would like to withdraw money from the user's bank account, and that he would like to notify the banking office of his approach. After receiving the user's input, the digital ID may cause the user's portable electronic device to transmit one or more signals to a digital ID reader at the banking office. The one or more signals may include information about the user (e.g., name, demographic information, address, phone number, etc.) and a message indicating the purpose of the user's trip. Employees of the banking office may therefore anticipate the user's arrival and be aware of the purpose of the user's visit. In addition, the user may conduct one or more transactions at the bank using the electronic payment systems or electronic wallets provided by the digital ID.

Hereinafter, another exemplary scenario of a shopper placing an order through the shopper's digital ID is described. In this example, the shopper's digital ID may be configured in the third mode such that the shopper has to request placement of an order.

In this example, the shopper may desire to place an order for an item with a retailer. The shopper may place an order for the item through one or several ways including, for example, an application of the retailer provided by the shopper's user device, a web site, or an ordering interface of the digital ID provided for retailers the shopper has an affinity for. After receiving the order from the shopper, the shopper's user device generates a steganographic order and transmits the shopper's digital ID with the embedded steganographic order to the retailer. The shopper's user device may then receive an acknowledgement message from a digital ID reader at the retailer. The acknowledgement message may also include an expected day and time of when the retailer can complete the order.

Around the expected day and time, the shopper may visit the retailer and display the shopper's digital ID to a digital reader at the retailer. The digital reader may optically scan the digital ID, de-embed the steganographic order, and determine whether the de-embedded order matches a previous stored order that was placed by the shopper. If the de-embedded order matches the stored order, the retailer delivers the order to the shopper.

It should be understood from the foregoing examples that the digital ID may utilize or communicate with various services, such as location service (e.g. Global Positioning System) servers, financial/banking/credit card services servers, and one or more networks (e.g., Internet, cellular services). Furthermore, it should be understood that employees of the vendor (e.g., banking outlet, franchise restaurant) are in real-time communication with the digital ID readers or servers of their vendor so that they serve their customers in a timely and enhanced manner.

It should be understood that implementations and/or actions described in this specification may be implemented in digital electronic circuitry, or in computer software, firmware, or hardware, including the structures disclosed in this specification and their structural equivalents, or in combinations of one or more of them. Implementations may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Implementations may be implemented in a computing system that includes a back end component, e.g., as a data server, or that includes a middleware component, e.g., an application server, or that includes a front end component, e.g., a client computer having a graphical customer interface or a Web browser through which a customer may interact with an implementation, or any combination of one or more such back end, middleware, or front end components. The components of the system may be interconnected by any form or medium of digital data communication, e.g., a communication network.

The computing system may include clients and servers. A client and server are generally remote from each other and typically interact through a communication network. The relationship of client and server arises by virtue of computer programs running on the respective computers and having a client-server relationship to each other.

What is claimed is:

1. A computer-implemented method comprising:
   obtaining, by one or more processors in a user device of a user, a digital identification of the user configured according to one or more user preferences, the one or more preferences comprising one or more services, vendors, or products preferred by the user;
   obtaining, by the one or more processors, order information describing an item to order from a vendor for the user, the vendor being associated with the one or more services, vendors, or products preferred by the user;
   determining, by the one or more processors, to order the item for the user;
   in response to determining to order the item for the user, extracting, by the one or more processors, an image of the user and user identification data from the digital identification of the user obtained by the user device;
   generating, by the one or more processors, a steganographic image of the user by steganographically embedding the order information and the user identification data in the image of the user extracted from the digital identification of the user; and
   providing, by the one or more processors and over one or more wireless networks to a vendor system of the vendor, the steganographic image that includes the order information steganographically embedded in the image of the user.

2. The computer-implemented method of claim 1, wherein:
   the image of the user extracted from the digital identification of the user comprises an image file, one or more of biometric data of the user, and membership information of the user with the vendor; and
   the order information comprises one or more of an indication of the item being ordered, an operation mode to implement the order, and payment information.

3. The computer-implemented method of claim 2, wherein obtaining the order information describing the item to order from the vendor for the user comprises:
   determining that the user has selected one of a first operation mode, a second operation mode, or a third operation mode to implement the order; and
   wherein providing, by the one or more processors, the steganographic image to the vendor system of the vendor comprises:
      determining a location of the user and a location of the vendor system of the vendor;
      in the first operation mode, transmitting the steganographic image to the vendor system in response to the location of the user and the location of the vendor system of the vendor being the same;
      in the second operation mode, transmitting the steganographic image to the vendor system in response to the location of the user being within a first threshold distance of the location of the vendor system of the vendor, the first threshold distance being set by the user; and
      in the third operation mode, transmitting the steganographic image to the vendor system in response to the location of the user corresponding to a distance that is greater than the first threshold distance from the location of the vendor system of the vendor.

4. The computer-implemented method of claim 1, wherein the digital identification comprises user data verified by a third-party resource.

5. The computer-implemented method of claim 1, wherein the digital identification comprises the image of the user that is selected by the user or provided by a third-party resource.

6. The computer-implemented method of claim 1, wherein generating the steganographic image comprises:
   steganographically embedding the order information and the user identification data into the obtained image to generate the steganographic image such that the steganographic image appears unaltered to a human eye and the order information and the user identification is data are not visible to the human eye.

7. The computer-implemented method of claim 1, wherein generating the steganographic image comprises:
   modifying one or more pixel values of the image without changing an appearance of the image to a human eye.

8. The computer-implemented method of claim 1, further comprising receiving an indication that one or more actions have been performed to satisfy the order, the one or more actions comprising:
   receiving the item associated with the order by the user;
   completing the order by the vendor;
   canceling, by the user or the vendor, the order; and
   modifying, by the user or the vendor, the order.

9. The computer-implemented method of claim 8, wherein receiving the indication that the one or more actions have been performed to satisfy the order comprises one or more of:
   receiving an input from the user indicating that the order is complete;
   receiving a steganographic message from the vendor system indicating that the order is complete;
   receiving an audio signal that includes data matching an identification of the user included in the digital identification of the user; and
   determining that a time duration after the steganographic image was provided to the vendor system satisfies an expiration threshold.

10. The computer-implemented method of claim 1, wherein providing, by the one or more processors, the steganographic image to the vendor system of the vendor comprises:
controlling a screen of the user device to display the steganographic image.

11. The computer-implemented method of claim 1, wherein providing, by the one or more processors, the steganographic image to the vendor system of the vendor comprises:
transmitting, by the user device over the over one or more wireless networks, the steganographic image.

12. A non-transitory computer-readable storage medium comprising instructions, which, when executed by one or more computers in a user device of a user, cause the one or more computers in the user device to perform actions comprising:
obtaining a digital identification of the user configured according to one or more user preferences, the one or more preferences comprising one or more services, vendors, or products preferred by the user;
obtaining order information describing an item to order from a vendor for the user the vendor being associated with the one or more services, vendors, or products preferred by the user;
determining to order the item for the user;
in response to determining to order the item for the user, extracting, by the one or more processors, an image of the user and user identification data from the digital identification of the user obtained by the user device;
generating a steganographic image of the user by steganographically embedding the order information and the user identification data in the image of the user extracted from the digital identification of the user; and
providing, over one or more wireless networks to a vendor system of the vendor, the steganographic image that includes the order information steganographically embedded in the image of the user.

13. The non-transitory computer-readable storage medium of claim 12, wherein:
the image of the user extracted from the digital identification of the user comprises an image file, one or more of biometric data of the user, and membership information of the user with the vendor; and
the order information comprises one or more of an indication of the item being ordered, an operation mode to implement the order, and payment information.

14. The non-transitory computer-readable storage medium of claim 12, wherein obtaining the order information describing the item to order from the vendor for the user comprises:
determining that the user has selected one of a first operation mode, a second operation mode, or a third operation mode to implement the order; and
wherein providing the steganographic image to the vendor system of the vendor comprises:
determining a location of the user and a location of the vendor system of the vendor;
in the first operation mode, transmitting the steganographic image to the vendor system in response to the location of the user and the location of the vendor system of the vendor being the same;
in the second operation mode, transmitting the steganographic image to the vendor system in response to the location of the user being within a first threshold distance of the location of the vendor system of the vendor, the first threshold distance being set by the user; and
in the third operation mode, transmitting the steganographic image to the vendor system in response to the location of the user corresponding to a distance that is greater than the first threshold distance from the location of the vendor system of the vendor.

15. The non-transitory computer-readable storage medium of claim 12, wherein generating the steganographic image comprises:
steganographically embedding the order information and the user identification data into the obtained image to generate the steganographic image such that the steganographic image appears unaltered to a human eye and the order information and the user identification data are not visible to the human eye; and
wherein providing the steganographic image to the vendor system of the vendor comprises one of:
controlling a screen of the user device to display the steganographic image; and
transmitting, over the over one or more wireless networks, the steganographic image.

16. A system comprising:
one or more computers and one or more storage devices storing instructions that are operable and when executed by one or more computers in a user device of a user, cause the one or more computers in the user device to perform actions comprising:
obtaining a digital identification of the user configured according to one or more user preferences, the one or more preferences comprising one or more services, vendors, or products preferred by the user;
obtaining order information describing an item to order from a vendor for the user, the vendor being associated with the one or more services, vendors, or products preferred by the user;
determining to order the item for the user;
in response to determining to order the item for the user, extracting, by the one or more processors, an image of the user and user identification data from the digital identification of the user obtained by the user device;
generating a steganographic image of the user by steganographically embedding the order information and the user identification data in the image of the user extracted from the digital identification of the user; and
providing, over one or more wireless networks to a vendor system of the vendor, the steganographic image that includes the order information steganographically embedded in the image of the user.

17. The system of claim 16, wherein:
the image of the user extracted from the digital identification of the user comprises an image file, one or more of biometric data of the user, and membership information of the user with the vendor; and
the order information comprises one or more of an indication of the item being ordered, an operation mode to implement the order, and payment information.

18. The system of claim 16, wherein obtaining the order information describing the item to order from the vendor for the user comprises:
determining that the user has selected one of a first operation mode, a second operation mode, or a third operation mode to implement the order; and wherein providing the steganographic image to the vendor system of the vendor comprises:
- determining a location of the user and a location of the vendor system of the vendor;
- in the first operation mode, transmitting the steganographic image to the vendor system in response to the location of the user and the location of the vendor system of the vendor being the same;
- in the second operation mode, transmitting the steganographic image to the vendor system in response to the location of the user being within a first threshold distance of the location of the vendor system of the vendor, the first threshold distance being set by the user; and
- in the third operation mode, transmitting the steganographic image to the vendor system in response to the location of the user corresponding to a distance that is greater than the first threshold distance from the location of the vendor system of the vendor.

19. The system of claim 16, wherein generating the steganographic image comprises:
- steganographically embedding the order information and the user identification data into the obtained image to generate the steganographic image such that the steganographic image appears unaltered to a human eye and the order information and the user identification data are not visible to the human eye; and
- wherein providing the steganographic image to the vendor system of the vendor comprises one of:
  - controlling a screen of the user device to display the steganographic image; and
  - transmitting, over the over one or more wireless networks, the steganographic image.

20. The system of claim 16, wherein the actions further comprise:
- receiving an indication that one or more actions have been performed to satisfy the order, the one or more actions comprising:
- receiving the item associated with the order by the user;
- completing the order by the vendor;
- canceling, by the user or the vendor, the order; and
- modifying, by the user or the vendor, the order, and
- wherein receiving the indication that the one or more actions have been performed to satisfy the order comprises one or more of:
  - receiving an input from the user indicating that the order is complete;
  - receiving a steganographic message from the vendor system indicating that the order is complete;
  - receiving an audio signal that includes data matching an identification of the user included in the digital identification of the user; and
  - determining that a time duration after the steganographic image was provided to the vendor system satisfies an expiration threshold.

* * * * *